United States Patent
Nagatoshi

(10) Patent No.: US 10,082,650 B2
(45) Date of Patent: Sep. 25, 2018

(54) WIDE-ANGLE LENS, PROJECTION DISPLAY DEVICE, AND IMAGING APPARATUS

(71) Applicant: FUJIFILM Corporation, Tokyo (JP)

(72) Inventor: Yukiko Nagatoshi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/688,031

(22) Filed: Aug. 28, 2017

(65) Prior Publication Data

US 2018/0059380 A1 Mar. 1, 2018

(30) Foreign Application Priority Data

Aug. 30, 2016 (JP) .................. 2016-168104

(51) Int. Cl.
| | |
|---|---|
| *G02B 3/00* | (2006.01) |
| *G02B 13/00* | (2006.01) |
| *G02B 27/09* | (2006.01) |
| *G02B 13/16* | (2006.01) |
| *G03B 17/17* | (2006.01) |
| *G02B 23/02* | (2006.01) |
| *G03B 21/28* | (2006.01) |
| *G02B 17/08* | (2006.01) |
| *G02B 15/177* | (2006.01) |
| *G02B 5/04* | (2006.01) |
| *G02B 5/08* | (2006.01) |

(52) U.S. Cl.
CPC ............ *G02B 13/0065* (2013.01); *G02B 5/04* (2013.01); *G02B 5/08* (2013.01); *G02B 13/001* (2013.01); *G02B 13/007* (2013.01); *G02B 13/16* (2013.01); *G02B 15/177* (2013.01); *G02B 17/08* (2013.01); *G02B 23/02* (2013.01); *G02B 27/0972* (2013.01); *G02B 27/0977* (2013.01); *G03B 17/17* (2013.01); *G03B 21/28* (2013.01)

(58) Field of Classification Search
CPC ...... G02B 5/04; G02B 13/16; G02B 13/0065; G02B 17/08; G02B 15/177; G02B 5/08; G02B 13/007; G02B 23/02; G02B 13/001; G02B 27/0972; G02B 27/0977; G03B 21/28; G03B 17/17
USPC .......... 359/649–651, 726, 733–737, 833–837
See application file for complete search history.

(56) References Cited

U.S. PATENT DOCUMENTS

| | | | |
|---|---|---|---|
| 6,995,930 B2 * | 2/2006 | Shafer .................. | G02B 13/143 359/364 |
| 8,508,853 B2 * | 8/2013 | Amano .................. | G02B 13/22 359/649 |

(Continued)

FOREIGN PATENT DOCUMENTS

| | | |
|---|---|---|
| JP | 2014-029392 A | 2/2014 |
| JP | 2015-060062 A | 3/2015 |

*Primary Examiner* — Evelyn A Lester
(74) *Attorney, Agent, or Firm* — Studebaker & Brackett PC

(57) ABSTRACT

The wide-angle lens forms an intermediate image at a position conjugate to a reduction side imaging plane and forms the intermediate image again on a magnification side imaging plane. The wide-angle lens includes: a first optical system on the magnification side; and a second optical system on the reduction side. The intermediate image is formed between the magnification side and the reduction side. The first optical system has an optical axis deflection prism which satisfies predetermined conditional expressions.

16 Claims, 20 Drawing Sheets

EXAMPLE 1

(56) References Cited

U.S. PATENT DOCUMENTS

| | | | |
|---|---|---|---|
| 8,508,855 B2* | 8/2013 | Yamamoto | G02B 13/04 359/651 |
| 8,967,812 B2* | 3/2015 | Amano | G02B 13/18 359/659 |
| 9,606,425 B2* | 3/2017 | Ode | G02B 27/0025 |
| 2008/0137216 A1* | 6/2008 | Nagatoshi | G02B 13/22 359/714 |
| 2011/0026111 A1* | 2/2011 | Nagatoshi | G02B 17/08 359/364 |
| 2012/0236277 A1* | 9/2012 | Schicketanz | G02B 13/14 359/733 |
| 2014/0036142 A1 | 2/2014 | Inoko | |
| 2015/0077848 A1 | 3/2015 | Ichimura | |

* cited by examiner

EXAMPLE 1

EXAMPLE 1

EXAMPLE 1

EXAMPLE 2

EXAMPLE 2

EXAMPLE 3

EXAMPLE 3

EXAMPLE 4

EXAMPLE 4

EXAMPLE 5

EXAMPLE 5

EXAMPLE 3

EXAMPLE 5

WIDE-ANGLE LENS, PROJECTION DISPLAY DEVICE, AND IMAGING APPARATUS

CROSS REFERENCE TO RELATED APPLICATIONS

The present application claims priority under 35 U.S.C. § 119 to Japanese Patent Application No. 2016-168104 filed on Aug. 30, 2016. The above application is hereby expressly incorporated by reference, in its entirety, into the present application.

BACKGROUND OF THE INVENTION

1. Field of the Invention

The present invention relates to a wide-angle lens forming an intermediate image, a projection display device comprising the wide-angle lens, and an imaging apparatus comprising the wide-angle lens.

2. Description of the Related Art

In the past, projection display devices, each of which uses a light valve such as a liquid crystal display element or a Digital Micromirror Device (DMD: registered trademark) display element, have come into widespread use. In particular, some widely used devices adopt a configuration in which three light valves are used, illumination light beams with three primary colors of red, green, and blue respectively correspond to the light valves, synthesizes the light beams, which are modulated through the respective light valves, through a prism or the like, and displays an image onto a screen through a wide-angle lens.

In such a wide-angle lens used in a type of the projection display device that synthesizes the light beams modulated through the three light valves through a color synthesis optical system and projects the light beams, as described above, in order for a prism or the like for performing color synthesis to be disposed therein and in order to avoid a thermal problem, a long back focal length is necessary. Further, since spectral characteristics of the color synthesizing prism change depending on an angle of incident light, it is necessary for the projection lens to have the characteristic that the entrance pupil is at a sufficiently far position in a case where the reduction side is set as the incident side, that is, to be telecentric on the reduction side.

It has become necessary for such a type of the wide-angle lens to perform favorable aberration correction appropriate for the resolutions of light valves. Further, from the viewpoint of installability, in order to cope with the demands to have a high zoom ratio function and to perform projection onto a large screen at a short distance, it is necessary for a wide-angle lens to have a wider angle of view.

A relay-type wide-angle lens, which forms an intermediate image at a position conjugate to the reduction side imaging plane and forms the intermediate image again on the magnification side imaging plane, has been proposed so as to cope with such demands (for example, JP2014-029392A and JP2015-060062A).

In a normal wide-angle lens of a system which does not form an intermediate image, in a case where an increase in angle of view is intended to be achieved by shortening a focal length thereof, the size of the magnification side lens becomes excessively large. However, in the above-mentioned relay-type wide-angle lens, it is possible to shorten a back focal length of the lens system closer to the magnification side than the intermediate image. Therefore, it is possible to decrease a magnification side lens diameter of the lens system closer to the magnification side than the intermediate image, and this configuration is appropriate for achieving an increase in angle of view by shortening a focal length thereof.

SUMMARY OF THE INVENTION

Each of the lens systems described in JP2014-029392A and JP2015-060062A is a relay type, where a diameter of the lens is set to be small with respect to an angle of view. However, also in JP2014-029392A and JP2015-060062A, in order to form the intermediate image once, inevitably, the total length of the lens has been set to be long, and reduction in size of the lens system and the entire apparatus has not been achieved.

The present invention has been made in consideration of the above-mentioned situations, and its object is to provide a wide-angle lens of a system that forms an intermediate image, the wide-angle lens being capable of satisfactorily correcting various aberrations with a wide angle while achieving reduction in size of the lens system and the entire apparatus, a projection display device comprising the wide-angle lens, and an imaging apparatus comprising the wide-angle lens.

A wide-angle lens of the present invention forms an intermediate image at a position conjugate to a reduction side imaging plane and forms the intermediate image again on a magnification side imaging plane. The wide-angle lens comprises: a first optical system on the magnification side; and a second optical system on the reduction side. The intermediate image is formed between the magnification side and the reduction side. The first optical system has an optical axis deflection prism which satisfies Conditional Expressions (1) to (3).

$$0.1 < xf/L1 < 0.6 \qquad (1)$$

$$0.2 < xr/L1 < 0.8 \qquad (2)$$

$$2.5 < d/|f| \qquad (3)$$

Here, xf is a distance on an optical axis from a magnification side surface of a lens closest to the magnification side in the first optical system to a magnification side surface of the optical axis deflection prism, xr is a distance on the optical axis from the magnification side surface of the lens closest to the magnification side in the first optical system to a reduction side surface of the optical axis deflection prism, L1 is a distance on the optical axis from the magnification side surface of the lens closest to the magnification side in the first optical system to the intermediate image, d is a length of the optical axis within the optical axis deflection prism, and f is a focal length of the whole system.

In addition, regarding the length of the optical axis within the optical axis deflection prism, in a case where the magnification side surface and the reduction side surface of the optical axis deflection prism are set as air and a prism lens is bonded to the optical axis deflection prism, the length of the optical axis of the entirety of those is measured. The length of the optical axis corresponds to a distance on the optical axis from the magnification side surface of the optical axis deflection prism to the reduction side surface thereof in a case where the optical axis of the wide-angle lens is developed linearly.

Further, in a case where the wide-angle lens has a zooming function, the focal length of the whole system is set as a focal length of the whole system at a wide-angle end.

It is preferable that the wide-angle lens of the present invention satisfies at least one of Conditional Expressions (1-1) to (3-1).

$$0.15<xf/L1<0.5 \quad (1\text{-}1)$$

$$0.3<xr/L1<0.7 \quad (2\text{-}1)$$

$$3<d/|f|<8 \quad (3\text{-}1)$$

It is preferable that the wide-angle lens satisfies Conditional Expression (4), and it is more preferable that the wide-angle lens satisfies Conditional Expression (4-1).

$$3<b/a<12 \quad (4)$$

$$5<b/a<8 \quad (4\text{-}1)$$

Here, b is a ray diameter within a meridian plane of a maximum image height at an F number which is five times a design F number at the wide-angle end, and a is a ray diameter of on-axis rays at the F number which is five times the design F number at the wide-angle end.

In a case where a projection distance is set to be infinite, the ray diameters of a and b are set as diameters of rays at a position closer to the magnification side than the lens surface closest to the magnification side. Further, a position of a stop for determining the F number in a case where a and b are calculated is set as a position at which the optical axis intersects with the principal ray at the maximum image height in the second optical system. Furthermore, the ray diameter of b is a ray diameter in a direction perpendicular to the principal ray.

It is preferable that the optical axis deflection prism is a prism which deflects the optical axis by 90°. In this case, the optical axis deflection prism may be a right angle prism, and may be formed by bonding a lens to a right angle prism.

The wide-angle lens may have a reflection member that further deflects the optical axis by 90°, at a position closer to the reduction side than the optical axis deflection prism.

It is preferable that the wide-angle lens satisfies Conditional Expression (5), and it is more preferable that the wide-angle lens satisfies Conditional Expression (5-1).

$$0.8 \le f1/|f| < 2 \quad (5)$$

$$1 \le f1/|f| < 1.7 \quad (5\text{-}1)$$

Here, f1 is a focal length of the first optical system, and f is a focal length of the whole system.

In addition, in a case where the wide-angle lens has a zooming function, the focal length of the first optical system is set as a focal length of the first optical system at the wide-angle end.

Further, in a case where the wide-angle lens has a zooming function, the focal length of the whole system is also set as a focal length of the whole system at the wide-angle end.

It is preferable that the wide-angle lens satisfies Conditional Expression (6), and it is more preferable that the wide-angle lens satisfies Conditional Expression (6-1).

$$30<vd \quad (6)$$

$$45<vd<65 \quad (6\text{-}1)$$

Here, vd is an Abbe number of the optical axis deflection prism based on a d line.

In addition, in a case where the optical axis deflection prism includes a plurality of optical members, the Abbe number of the optical axis deflection prism based on the d line is set as a numerical value represented by the following expression.

$$vd = 1/d \times \Sigma(di \times vdi)$$

Here, d is a length of the optical axis within the optical axis deflection prism, di is a length of the optical axis within the i-th optical member, and vdi is an Abbe number of the i-th optical member based on the d line.

A projection display device of the present invention comprises: a light source; a light valve into which light originating from the light source is incident; and the wide-angle lens of the present invention, the wide-angle lens projecting an optical image, which is formed by light modulated through the light valve, onto a screen.

An imaging apparatus of the present invention comprises the above-mentioned wide-angle lens of the present invention.

It should be noted that the "magnification side" means a projected side (screen side). Even in a case where projection is performed in a reduced manner, for convenience, the screen side is referred to as the magnification side. On the other hand, the "reduction side" means an image display element side (light valve side). Even in a case where projection is performed in a reduced manner, for convenience, the light valve side is referred to as the reduction side.

Further, the "comprises . . . " means that the wide-angle lens may include not only the above-mentioned elements but also lenses substantially having no powers, optical elements, which are not lenses, such as a mirror having no power, a stop, a mask, a cover glass, a filter, and the like.

Further, regarding the "back focal length", the following assumption is considered: the magnification side and the reduction side respectively correspond to the object side and the image side of a general imaging lens, and the magnification side and the reduction side are respectively referred to as the front side and the back side.

According to the present invention, the wide-angle lens forms an intermediate image at the position conjugate to the reduction side imaging plane and forms the intermediate image again on the magnification side imaging plane. The wide-angle lens comprises: the first optical system on the magnification side; and the second optical system on the reduction side. The intermediate image is formed between the magnification side and the reduction side. The first optical system has the optical axis deflection prism which satisfies Conditional Expressions (1) to (3). Therefore, it is possible to provide a small size wide-angle lens that is capable of satisfactorily correcting various aberrations with a wide angle while achieving reduction in size of the lens system and the entire apparatus, a projection display device comprising the wide-angle lens, and an imaging apparatus comprising the wide-angle lens.

$$0.1<xf/L1<0.6 \quad (1)$$

$$0.2<xr/L1<0.8 \quad (2)$$

$$2.5<d/|f| \quad (3)$$

DESCRIPTION OF THE PREFERRED EMBODIMENTS

Figure 1:
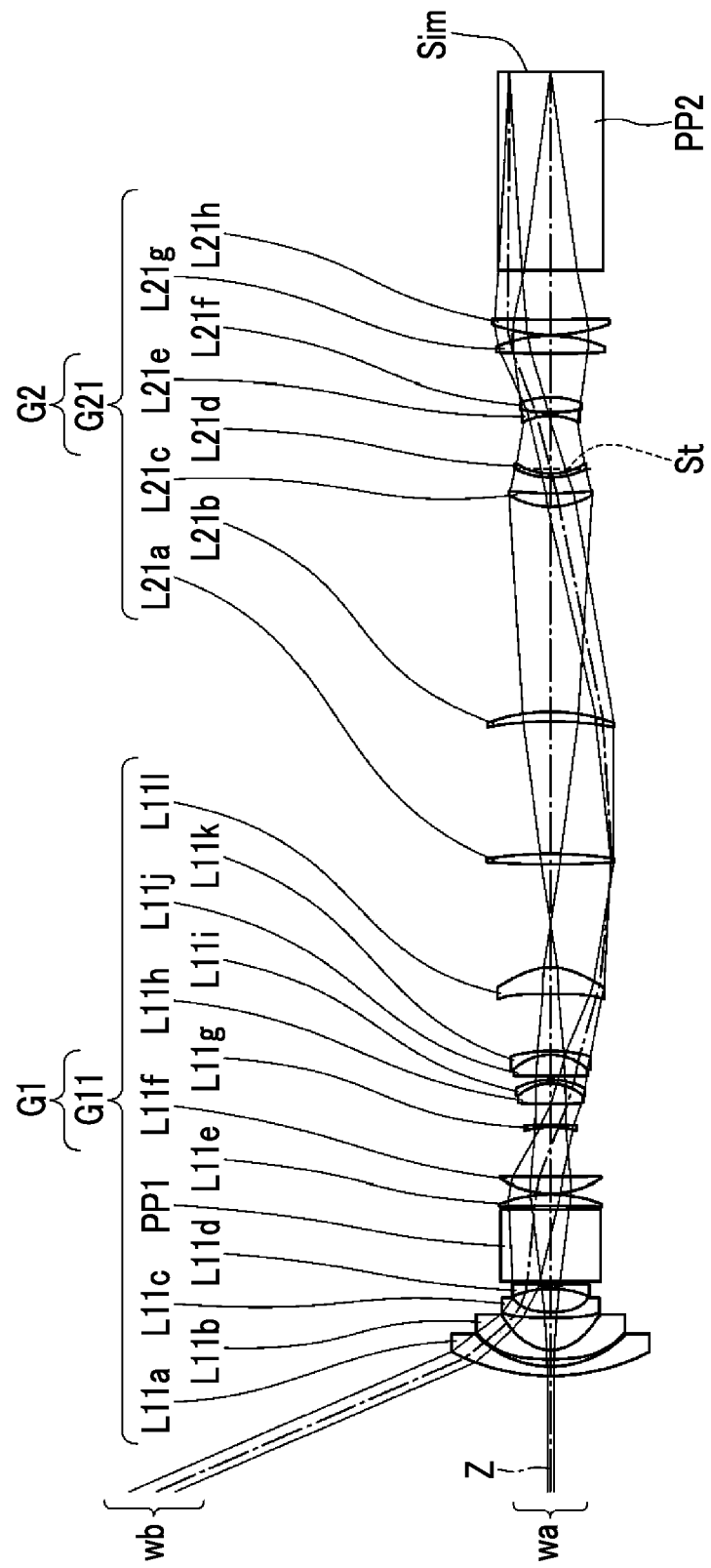
FIG. 1 is a cross-sectional view illustrating a configuration of a wide-angle lens (common to Example 1) according to an embodiment of the present invention in a state where the optical path thereof is developed.
Figure 2:
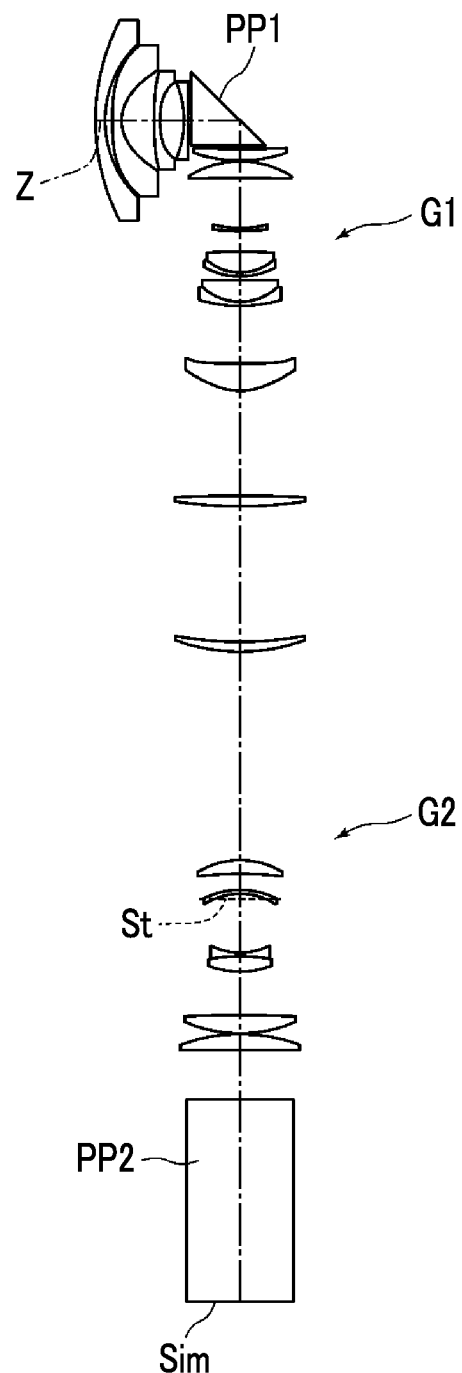
FIG. 2 is a cross-sectional view illustrating a configuration of the wide-angle lens in an actual state.

Hereinafter, embodiments of the present invention will be described with reference to drawings. FIG. 1 is a cross-sectional view illustrating a configuration of a wide-angle lens according to an embodiment of the present invention in a state where the optical path thereof is developed. FIG. 2 is a cross-sectional view illustrating a configuration of the wide-angle lens in an actual state. The exemplary configurations shown in FIGS. 1 and 2 are the same as the configuration of the wide-angle lens of Example 1. In each of FIGS. 1 and 2, an image display surface Sim side is the reduction side, and a lens L11a side of a first optical system G1 is a magnification side. In addition, an aperture stop St shown in the drawing does not necessarily show its real size and shape, but show a position on an optical axis Z. Further, in FIG. 1, on-axis rays wa and rays with a maximum angle of view wb are also shown together.

This wide-angle lens is, for example, mounted on a projection display device, and can be used to project image information displayed on the light valve onto the screen. In each of FIGS. 1 and 2, assuming that the wide-angle lens is mounted on the projection display device, an optical member PP2 such as a filter or a prism used in a color synthesizing section or an illumination light separating section, and an image display surface Sim of a light valve positioned on a reduction side surface of the optical member PP2 are also shown. In the projection display device, rays, which are made to have image information through the image display surface Sim on the image display element, are incident into the wide-angle lens through the optical member PP2, and are transmitted onto a screen, which is not shown in the drawing, through the wide-angle lens.

As shown in FIGS. 1 and 2, a wide-angle lens of the present embodiment forms an intermediate image at a position conjugate to a reduction side imaging plane (image display surface Sim) and forms the intermediate image again on a magnification side imaging plane. The wide-angle lens includes: the first optical system G1 on the magnification side; and a second optical system G2 on the reduction side. The intermediate image is formed therebetween.

In a normal wide-angle lens of a system which does not form an intermediate image, in a case where an increase in angle of view is intended to be achieved by shortening a focal length thereof, the size of the magnification side lens inevitably becomes excessively large. However, in a manner similar to that of the present embodiment, in a wide-angle lens of a system which forms an intermediate image, it is possible to shorten a back focal length of the first optical system G1 closer to the magnification side than the intermediate image. In addition, it is possible to decrease a magnification side lens diameter, and this configuration is appropriate for achieving an increase in angle of view by shortening a focal length thereof The first optical system G1 is configured to have an optical axis deflection prism PP1 which satisfies Conditional Expressions (1) to (3).

$$0.1 < xf/L1 < 0.6 \quad (1)$$

$$0.2 < xr/L1 < 0.8 \quad (2)$$

$$2.5 < d/|f| \quad (3)$$

Here, xf is a distance on an optical axis from a magnification side surface of a lens closest to the magnification side in the first optical system G1 to a magnification side surface of the optical axis deflection prism PP1, xr is a distance on the optical axis from the magnification side surface of the lens closest to the magnification side in the first optical system G1 to a reduction side surface of the optical axis deflection prism PP1, L1 is a distance on the optical axis from the magnification side surface of the lens closest to the magnification side in the first optical system G1 to the intermediate image, d is a length of the optical axis within the optical axis deflection prism PP1, and f is a focal length of the whole system.

In a system that forms an intermediate image in a manner similar to that of the present embodiment, inevitably, the total length of the lens becomes long, but the optical axis deflection prism PP1 is disposed in the first optical system G1 so as to deflect the optical axis of the wide-angle lens. Thereby, it is possible to achieve reduction in size of the entire apparatus. Further, in a case where the wide-angle lens of the present embodiment is mounted on a projection display device, the optical axis of the wide-angle lens can be deflected with respect to the projection direction of the image. Thus, it is possible to shorten a distance from the screen to the end of the projection display device. As a result, it is possible to achieve reduction in size of the whole system including the screen and the projection display device.

By not allowing the result of Conditional Expression (1) to be equal to or less than the lower limit, also in a case of the wide-angle lens, the incident angle of light around the angle of view is suppressed, and thus it is possible to suppress occurrence of astigmatism. By not allowing the result of Conditional Expression (1) to be equal to or greater than the upper limit, there is an advantage in reducing the size of the apparatus. In addition, in a case where Conditional Expression (1-1) is satisfied, it is possible to obtain more favorable characteristics.

$$0.15<xf/L1<0.5 \tag{1-1}$$

By not allowing the result of Conditional Expression (2) to be equal to or less than the lower limit, also in a case of the wide-angle lens, the incident angle of light around the angle of view is suppressed, and thus it is possible to suppress occurrence of astigmatism. By not allowing the result of Conditional Expression (2) to be equal to or greater than the upper limit, there is an advantage in reducing the size of the apparatus. In addition, in a case where Conditional Expression (2-1) is satisfied, it is possible to obtain more favorable characteristics.

$$0.3<xr/L1<0.7 \tag{2-1}$$

By not allowing the result of Conditional Expression (3) to be equal to or less than the lower limit, in a case where the optical axis deflection prism PP1 is applied to the wide-angle lens, a thickness thereof can be set to be enough to deflect the optical axis. In addition, in a case where Conditional Expression (3-1) is satisfied, it is possible to obtain more favorable characteristics. By not allowing the result of Conditional Expression (3-1) to be equal to or greater than the upper limit, the thickness of the optical axis deflection prism PP1 is suppressed. As a result, there is an advantage in reducing costs thereof and reducing the weight thereof.

$$3<d/|f|<8 \tag{3-1}$$

It is preferable that the wide-angle lens of the present invention satisfies Conditional Expression (4). By not allowing the result of Conditional Expression (4) to be equal to or less than the lower limit, it is possible to realize a lens which has a wide angle of view, in which various aberrations are satisfactorily corrected, and for which a peripheral light amount ratio is ensured. By not allowing the result of Conditional Expression (4) to be equal to or greater than the upper limit, it is possible to prevent the outer diameter of the lens from being increased. In addition, in a case where Conditional Expression (4-1) is satisfied, it is possible to obtain more favorable characteristics.

$$3<b/a<12 \tag{4}$$

$$5<b/a<8 \tag{4-1}$$

Here, b is a ray diameter within a meridian plane of a maximum image height at an F number which is five times a design F number at the wide-angle end, and a is a ray diameter of on-axis rays at the F number which is five times the design F number at the wide-angle end.

For reduction in size of the apparatus, it is most preferable that the angle of deflection of the optical axis is set to 90°. Thus, it is preferable that the optical axis deflection prism PP1 is a prism which deflects the optical axis by 90°. In this case, the optical axis deflection prism PP1 may be a right angle prism. By using the right angle prism in such a manner, it is possible to most effectively deflect the optical axis by 90°. Further, the optical axis deflection prism PP1 may be formed by bonding a lens to a right angle prism. By bonding a lens to a right angle prism in such a manner, the number of interfaces with air is reduced. As a result, it is possible to improve a light transmittance thereof.

Figure 3:
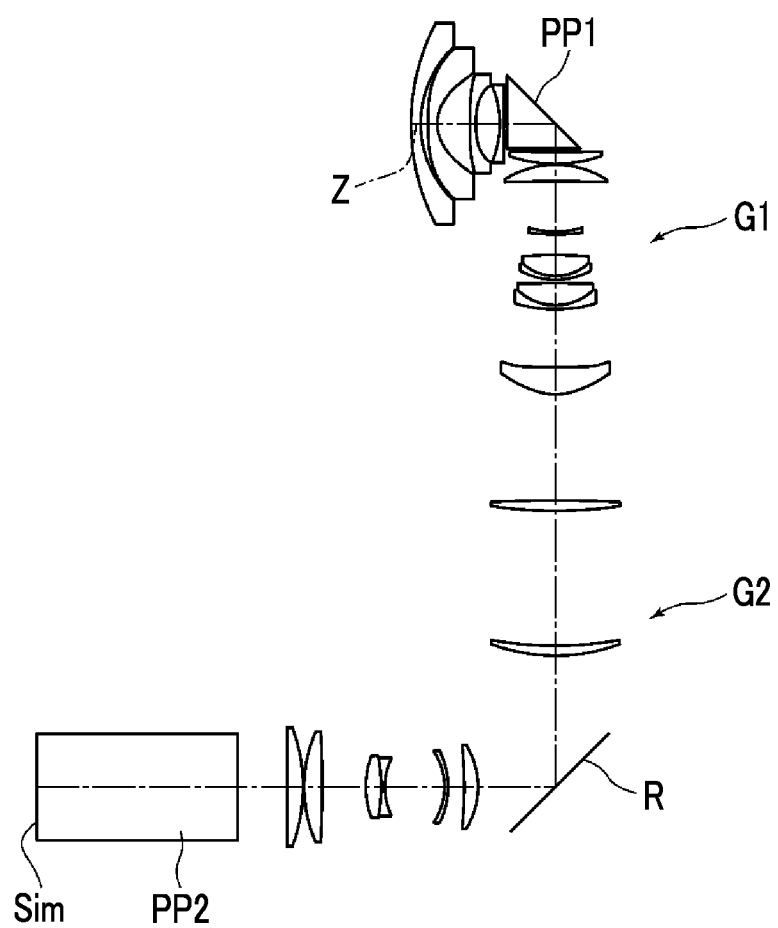
FIG. 3 is a cross-sectional view illustrating a configuration of the wide-angle lens in a state where a reflection member is added to the wide-angle lens.

As shown in FIG. 3, the wide-angle lens may have a reflection member R that further deflects the optical axis by 90°, at a position closer to the reduction side than the optical axis deflection prism PP1. In such an embodiment, by deflecting the optical axis twice, it is possible to more effectively achieve reduction in size of the entire wide-angle lens.

It is preferable that the wide-angle lens satisfies Conditional Expression (5). By not allowing the result of Conditional Expression (5) to be equal to or less than the lower limit, there is an advantage in correcting spherical aberration, field curvature, and astigmatism. By not allowing the result of Conditional Expression (5) to be equal to or greater than the upper limit, it is possible to minimize a lens diameter near the intermediate imaging position. In addition, in a case where Conditional Expression (5-1) is satisfied, it is possible to obtain more favorable characteristics.

$$0.8<f1/|f|<2 \tag{5}$$

$$1<f1/|f|<1.7 \tag{5-1}$$

Here, f1 is a focal length of the first optical system G1, and f is a focal length of the whole system.

It is preferable that the wide-angle satisfies Conditional Expression (6). By not allowing the result of Conditional Expression (6) to be equal to or less than the lower limit, it is possible to suppress occurrence of longitudinal chromatic aberration. In addition, in a case where Conditional Expression (6-1) is satisfied, it is possible to obtain more favorable characteristics. Material costs of the materials with large Abbe numbers are high. Hence, by not allowing the result of Conditional Expression (6-1) to be equal to or greater than the upper limit, reduction in costs is achieved.

$$30<vd \tag{6}$$

$$45<vd<65 \tag{6-1}$$

Here, vd is an Abbe number of the optical axis deflection prism PP1 based on a d line.

Next, numerical examples of the wide-angle lens of the present invention will be described.

First, a wide-angle lens of Example 1 will be described. FIG. 1 is a cross-sectional view illustrating a configuration of the wide-angle lens of Example 1 in a state where the optical path thereof is developed. FIG. 2 is a cross-sectional view illustrating a configuration of the wide-angle lens in an actual state. In addition, in FIGS. 1 and 2 and FIGS. 4 to 11 corresponding to Examples 2 to 5, an image display surface Sim side is the reduction side, a lens L11a side of a first optical system G1 is a magnification side, and an aperture stop St shown in the drawing does not necessarily show its real size and shape, but show a position on an optical axis Z. Further, in FIGS. 1, 4, 6, 8, and 10, on-axis rays wa and rays with a maximum angle of view wb are also shown together.

The wide-angle lens of Example 1 includes the first optical system G1 on the magnification side, and a second optical system G2 on the reduction side, in a state where the intermediate image is formed therebetween. The first optical system G1 includes only a first-1 lens group G11. The second optical system G2 includes only a second-1 lens group G21.

The first-1 lens group G11 includes the optical axis deflection prism PP1 and twelve lenses as lenses L11a to L11l. The second-1 lens group G21 includes eight lenses as lenses L21a to L21h.

Table 1 shows lens data of the wide-angle lens of Example 1, Table 2 shows data about specification, and Table 3 shows data about aspheric coefficients thereof. Hereinafter, meanings of the reference signs in the tables are, for example, as described in Example 1, and are basically the same as those in Examples 2 to 5.

In the lens data of Table 1, the column of the surface number shows surface numbers. The surface of the elements closest to the magnification side is the first surface, and the surface numbers sequentially increase toward the reduction side. The column of the radius of curvature shows radii of curvature of the respective surfaces. The column of the on-axis surface spacing shows spacings on the optical axis Z between the respective surfaces and the subsequent surfaces. Further, the column of n shows a refractive index of each optical element at the d line (a wavelength of 587.6 nm), and the column of ν shows an Abbe number of each optical element at the d line (a wavelength of 587.6 nm). Here, the sign of the radius of curvature is positive in a case where a surface has a shape convex toward the magnification side, and is negative in a case where a surface has a shape convex toward the reduction side. The lens data additionally shows the aperture stop St, the optical axis deflection prism PP1, and the optical member PP2.

In examples to be described later, there are wide-angle lenses each of which has a zooming function. In such a case, in the lens data, in each place of the surface spacing which is variable during zooming, DD[surface number] is noted. Numerical values each corresponding to the DD[surface number] are shown in another table.

In the data about the specification of Table 2, values of the zoom ratio, the focal length f, back focal length Bf, the F number FNo., and the total angle of view 2ω are noted.

In the lens data of Table 1, the reference sign * is attached to surface numbers of aspheric surfaces, and radii of curvature of the aspheric surfaces are represented by numerical values of paraxial radii of curvature. The data about aspheric coefficients of Table 3 shows the surface numbers of the aspheric surfaces and aspheric coefficients of the aspheric surfaces. The "E±n" (n: an integer) in numerical values of the aspheric coefficients of Table 3 indicates "×10$^{\pm n}$". The aspheric coefficients are values of the coefficients KA and Am (m=3 ... maximum 20) in aspheric surface expression represented by the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric coefficients (m=3 ... maximum 20).

TABLE 1

EXAMPLE 1·LENS DATA (n AND ν ARE BASED ON d LINE)

| SURFACE NUMBER | RADIUS OF CURVATURE | SURFACE SPACING | n | ν |
|---|---|---|---|---|
| 1 | 52.2733 | 2.3077 | 1.48749 | 70.24 |
| 2 | 25.3954 | 1.8060 | | |
| *3 | −385.1108 | 2.1978 | 1.74320 | 49.29 |
| *4 | 10.6573 | 7.8388 | | |
| *5 | 109.7748 | 1.3731 | 1.80610 | 40.88 |
| *6 | 24.3857 | 5.7578 | | |
| 7 | −23.6985 | 0.9306 | 1.80610 | 33.27 |
| 8 | 563.2690 | 0.8242 | | |
| 9 | ∞ | 17.5824 | 1.56883 | 56.04 |
| 10 | ∞ | 0.8242 | | |
| 11 | −356.1938 | 2.8130 | 1.77250 | 49.60 |
| 12 | −34.1686 | 0.2202 | | |
| 13 | 22.9422 | 3.9532 | 1.85150 | 40.78 |
| 14 | 495.6522 | 12.0189 | | |
| 15 | −24.7239 | 0.6694 | 1.89286 | 20.36 |
| 16 | −66.8331 | 4.9834 | | |
| 17 | 103.0177 | 5.0057 | 1.49700 | 81.54 |
| 18 | −11.9483 | 0.0166 | | |
| 19 | −12.0465 | 0.8900 | 1.85478 | 24.80 |
| 20 | −17.9969 | 0.8750 | | |
| 21 | 909.5290 | 5.2182 | 1.49700 | 81.54 |
| 22 | −13.1469 | 0.0271 | | |
| 23 | −13.0841 | 0.9914 | 1.85478 | 24.80 |
| 24 | −34.1300 | 13.8424 | | |
| *25 | −164.0339 | 6.5252 | 1.58573 | 59.70 |
| *26 | −13.1187 | 25.1621 | | |
| 27 | 311.8847 | 2.5161 | 1.85478 | 24.80 |
| 28 | −105.8212 | 32.3113 | | |
| 29 | −86.5301 | 2.3741 | 1.85478 | 24.80 |
| 30 | −44.5209 | 50.0264 | | |
| 31 | 19.3210 | 3.2958 | 1.59522 | 67.73 |
| 32 | 93.4998 | 3.8734 | | |
| 33 | 19.4387 | 0.8681 | 1.51742 | 52.43 |
| 34 | 15.2313 | 1.2775 | | |
| 35(STOP) | ∞ | 12.8628 | | |
| 36 | −15.3036 | 0.8152 | 1.85478 | 24.80 |
| 37 | 38.0222 | 0.0476 | | |
| 38 | 39.9436 | 3.6750 | 1.49700 | 81.54 |
| 39 | −20.9972 | 10.4314 | | |
| 40 | 257.5144 | 4.3719 | 1.49700 | 81.54 |
| 41 | −33.1957 | 0.2198 | | |
| 42 | 40.5187 | 3.7730 | 1.80809 | 22.76 |
| 43 | 1220.7078 | 11.9231 | | |
| 44 | ∞ | 48.4615 | 1.51680 | 64.20 |
| 45 | ∞ | | | |

TABLE 2

EXAMPLE 1·SPECIFICATION (d LINE)

| | |
|---|---|
| ZOOM RATIO | 1.00 |
| f | −4.35 |
| Bf | 43.9 |
| FNo. | 2.50 |
| 2ω [°] | 133.0 |

TABLE 3

| EXAMPLE 1·ASPHERIC COEFFICIENT | | | |
|---|---|---|---|
| SURFACE NUMBER | 3 | 4 | 5 |
| KA | −1.50000072E+01 | −1.66899425E+00 | −5.58545512E−08 |
| A3 | 1.54108994E−03 | 2.32792890E−03 | −5.66645319E−04 |
| A4 | −3.25848397E−05 | −2.68898588E−04 | 8.68911228E−05 |
| A5 | −4.50937669E−07 | 7.77491019E−05 | 9.58080880E−07 |
| A6 | 4.15783383E−08 | −1.31931883E−05 | −6.26695391E−08 |
| A7 | 2.14600373E−09 | 1.60395903E−06 | −5.08148500E−09 |
| A8 | −8.61941173E−11 | −1.38449700E−07 | −2.06226722E−10 |
| A9 | −1.50156533E−13 | 8.56651185E−09 | −1.91004739E−11 |
| A10 | 5.12075208E−14 | −3.86950372E−10 | 1.47048372E−12 |
| A11 | −8.81517122E−16 | 1.26379784E−11 | |
| A12 | 1.29168606E−16 | −3.11733326E−13 | |
| A13 | 6.25603618E−19 | 4.58262503E−15 | |
| A14 | 2.39937895E−19 | −6.33323008E−18 | |
| A15 | −8.09840807E−21 | 8.35676406E−18 | |
| A16 | −4.84618034E−22 | −8.27154729E−19 | |
| SURFACE NUMBER | 6 | 25 | 26 |
| KA | −3.79041912E+00 | −1.50000000E+01 | −1.44130417E+00 |
| A3 | −6.34655712E−04 | −1.61925631E−04 | −3.21510431E−04 |
| A4 | 3.14164558E−04 | 1.17367366E−04 | 1.33424921E−04 |
| A5 | −4.94314245E−06 | −1.68177793E−05 | −6.70346795E−06 |
| A6 | 2.77685322E−07 | 1.82630145E−06 | −1.11679930E−06 |
| A7 | 3.72789973E−08 | −4.46315410E−07 | 1.43615020E−07 |
| A8 | −5.79123942E−10 | 6.51097451E−08 | −9.62388933E−09 |
| A9 | −9.72209772E−11 | −4.50028750E−09 | 6.80454850E−10 |
| A10 | 5.89526246E−11 | 8.25147767E−11 | −2.96327290E−11 |
| A11 | | 4.39784129E−12 | 1.50780212E−13 |
| A12 | | 2.85592181E−13 | −1.55382133E−15 |
| A13 | | −6.82374368E−14 | 1.68538118E−15 |
| A14 | | 3.41880217E−15 | −2.17292041E−16 |
| A15 | | −6.97295791E−17 | 3.86263878E−18 |
| A16 | | 1.48245579E−18 | 6.14489130E−19 |

Figure 12:
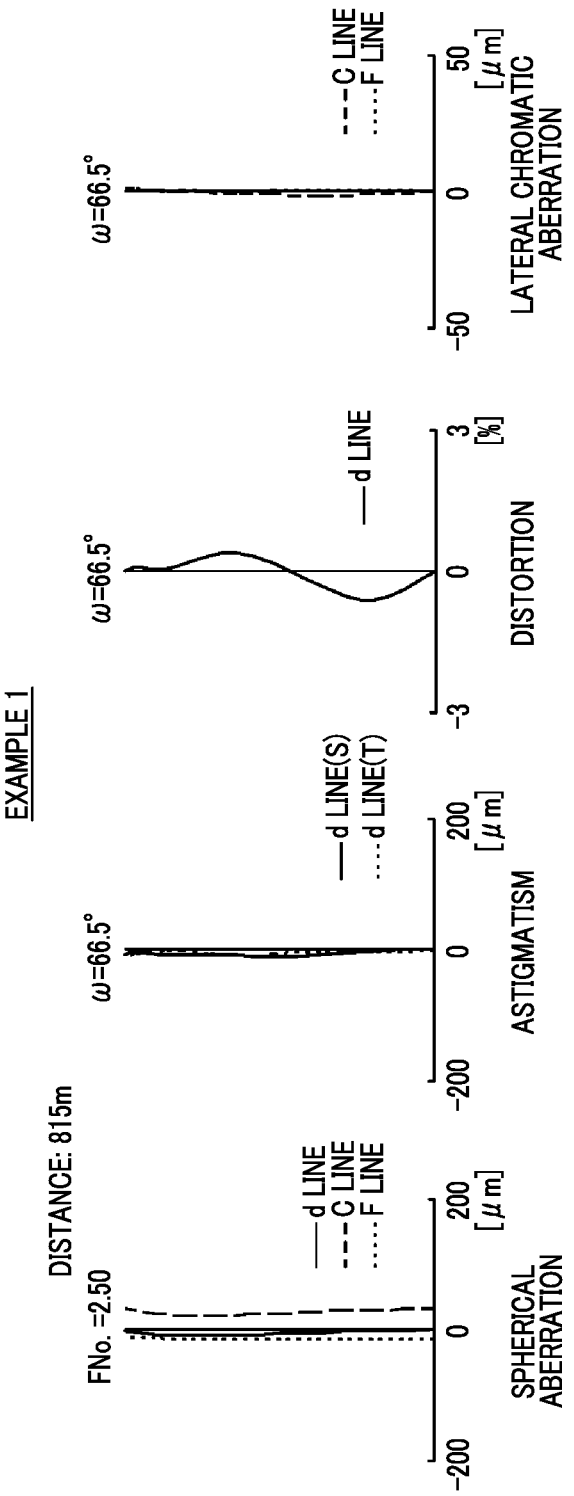
FIG. 12 is a diagram of aberrations of the wide-angle lens of Example 1 of the present invention.

FIG. 12 shows aberration diagrams of the wide-angle lens of Example 1. In order from the left side of FIG. 12, spherical aberration, astigmatism, distortion, and lateral chromatic aberration are shown. In examples to be described later, there are wide-angle lenses each of which has a zooming function. In such a case, in aberration diagrams, aberration diagrams at the wide-angle end are shown in the upper part thereof, and aberration diagrams at the telephoto end are shown in the lower part thereof. These aberration diagrams show states in a case where the projection distance is set as distances noted in the aberration diagrams. The aberration diagrams illustrating spherical aberration, astigmatism, and distortion indicate aberrations that occur in a case where the d line (a wavelength of 587.6 nm) is set as a reference wavelength. In the spherical aberration diagram, aberrations at the d line (a wavelength of 587.6 nm), the C line (a wavelength of 656.3 nm), and the F line (a wavelength of 486.1 nm) are respectively indicated by the solid line, the long dashed line, and the short dashed line. In the astigmatism diagram, aberrations in sagittal and tangential directions are respectively indicated by the solid line and the short dashed line. In the lateral chromatic aberration, aberrations at the C line (wavelength 656.3 nm) and F line (wavelength 486.1 nm) are respectively indicated by the long dashed line and the short dashed line. In the spherical aberration diagram, FNo. means an F number. In the other aberration diagrams, ω means a half angle of view.

In the description of Example 1, reference signs, meanings, and description methods of the respective data pieces are the same as those in the following examples unless otherwise noted. Therefore, in the following description, repeated description will be omitted.

Figure 4:
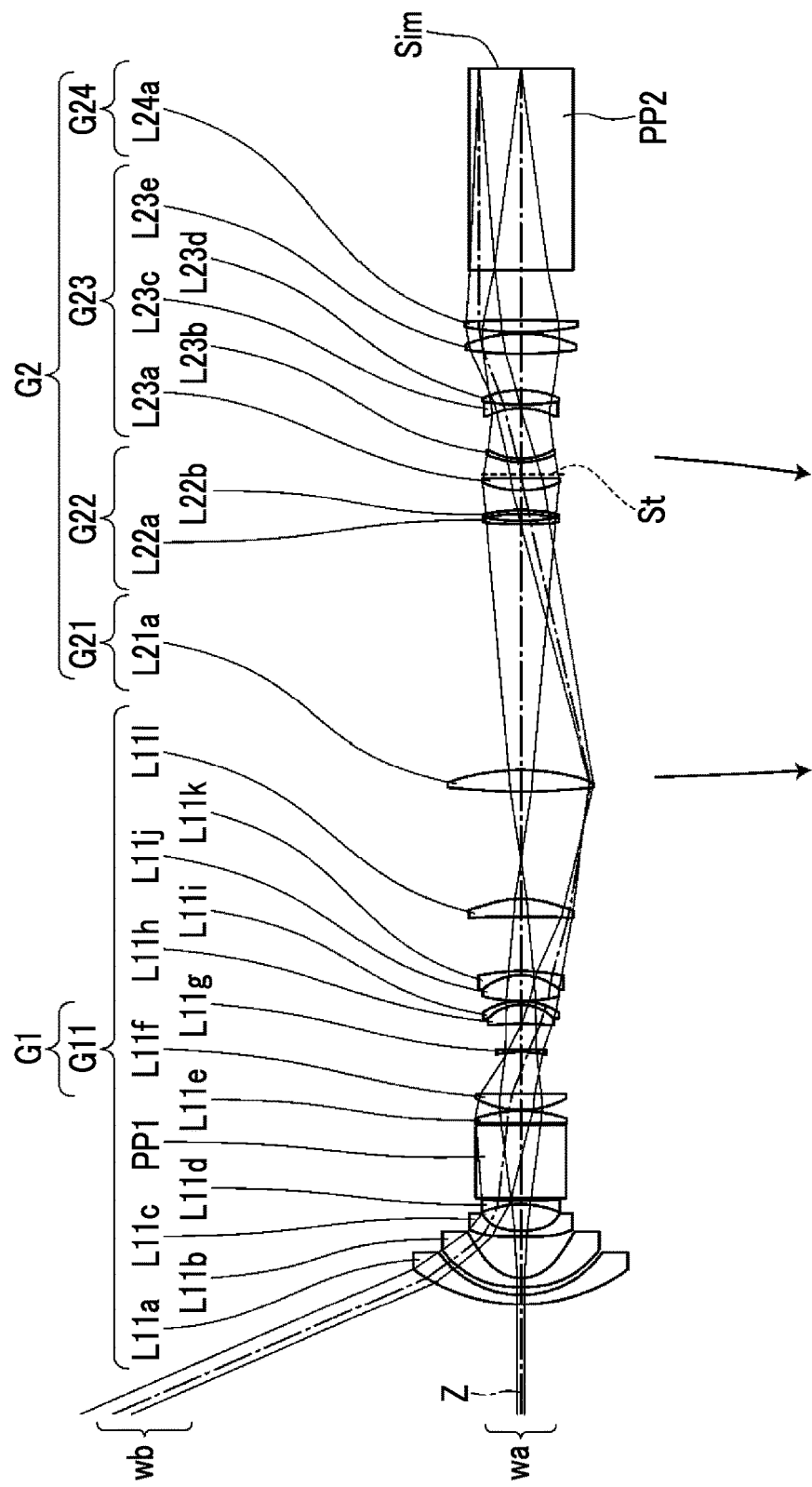
FIG. 4 is a cross-sectional view illustrating a configuration of a wide-angle lens of Example 2 of the present invention in a state where the optical path thereof is developed.
Figure 5:
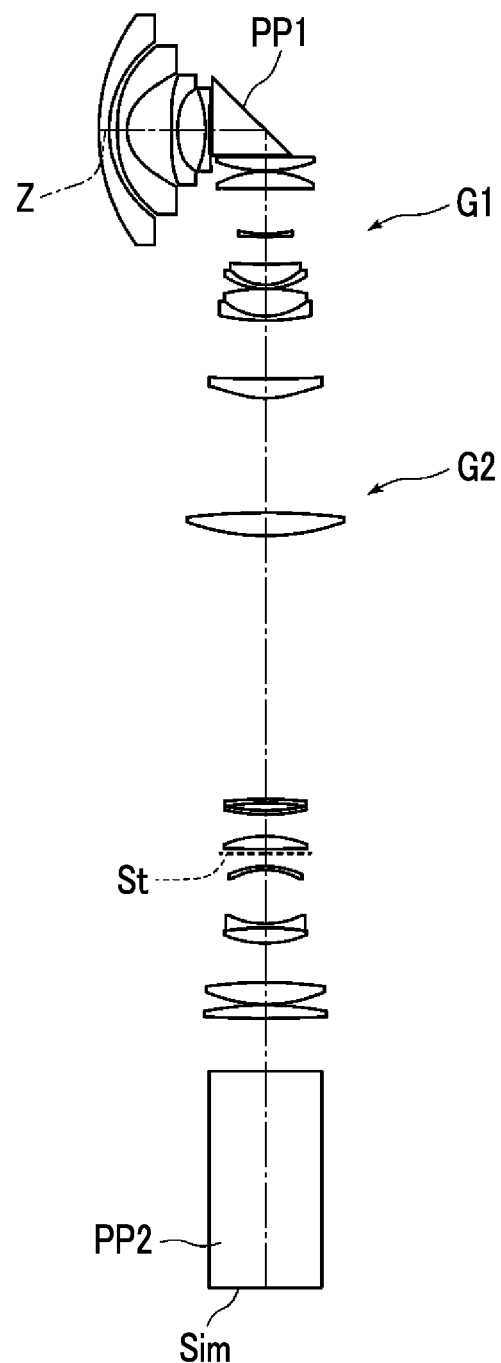
FIG. 5 is a cross-sectional view illustrating a configuration of the wide-angle lens in an actual state.

Next, a wide-angle lens of Example 2 will be described. FIG. 4 is a cross-sectional view illustrating a configuration of the wide-angle lens of Example 2 in a state where the optical path thereof is developed. FIG. 5 is a cross-sectional view illustrating a configuration of the wide-angle lens in an actual state.

The wide-angle lens of Example 2 is a wide-angle lens having a zooming function, and includes a first optical system G1 on the magnification side, and a second optical system G2 on the reduction side, in a state where the intermediate image is formed therebetween. The first optical system G1 includes only a first-1 lens group G11. The second optical system G2 includes a second-1 lens group G21, a second-2 lens group G22, a second-3 lens group G23, and a second-4 lens group G24.

The first-1 lens group G11, the second-2 lens group G22, and the second-4 lens group G24 remain stationary with respect to the reduction side imaging plane (image display surface Sim) during zooming. The second-1 lens group G21 and the second-3 lens group G23 are configured to move by changing spacings of the groups adjacent to each other in the direction of the optical axis during zooming.

The first-1 lens group G11 includes the optical axis deflection prism PP1 and twelve lenses as lenses L11a to L11l. The second-1 lens group G21 includes one lens as only a lens L21a. The second-2 lens group G22 includes two lenses as lenses L22a and L22b. The second-3 lens group G23 includes five lenses as lenses L23a to L23e. The second-4 lens group G24 includes one lens as only a lens L24a.

Figure 13:
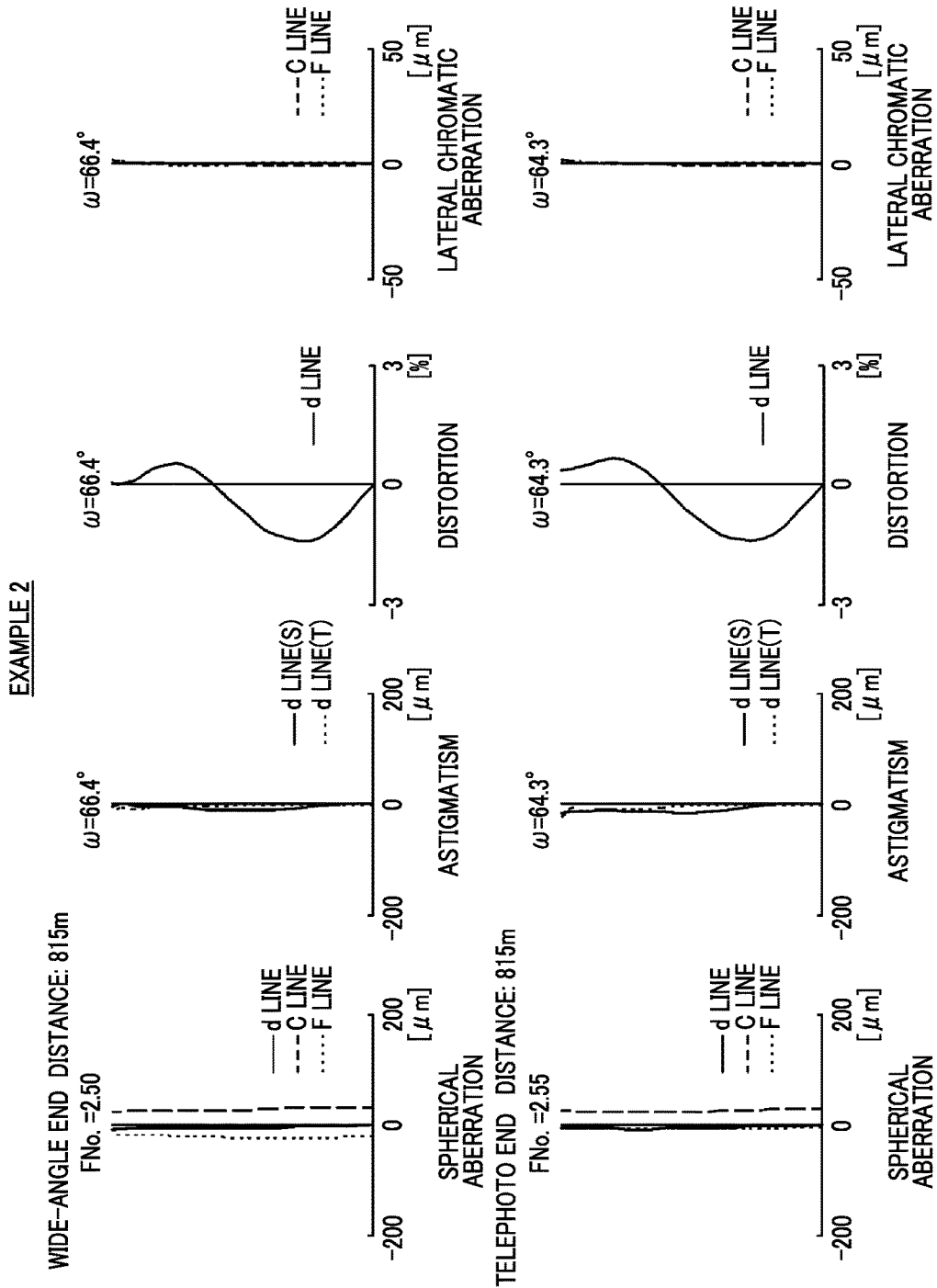
FIG. 13 is a diagram of aberrations of the wide-angle lens of Example 2 of the present invention.

Table 4 shows lens data of the wide-angle lens of Example 2, Table 5 shows data about specification, Table 6 shows surface spacings which are variable during zooming, Table 7 shows data about aspheric coefficients thereof, and FIG. 13 shows aberration diagrams.

TABLE 4

EXAMPLE 2 • LENS DATA (n AND ν ARE BASED ON d LINE)

| SURFACE NUMBER | RADIUS OF CURVATURE | SURFACE SPACING | n | ν |
|---|---|---|---|---|
| 1 | 43.5493 | 2.3077 | 1.48749 | 70.24 |
| 2 | 24.1070 | 1.8717 | | |
| *3 | 101.3646 | 2.1978 | 1.74320 | 49.29 |
| *4 | 10.7995 | 9.9458 | | |
| *5 | 357.4973 | 1.3738 | 1.80610 | 40.88 |
| *6 | 23.4037 | 6.2835 | | |
| 7 | −23.8538 | 0.9143 | 1.80610 | 33.27 |
| 8 | 150.0660 | 0.5495 | | |
| 9 | ∞ | 17.5824 | 1.56883 | 56.04 |
| 10 | ∞ | 0.2747 | | |
| 11 | 775.0687 | 3.0934 | 1.77250 | 49.60 |
| 12 | −32.7611 | 0.2203 | | |
| 13 | 22.5698 | 3.7803 | 1.85150 | 40.78 |
| 14 | 1455.2083 | 10.1488 | | |
| 15 | −30.0176 | 0.6430 | 1.89286 | 20.36 |
| 16 | −152.5180 | 6.1958 | | |
| 17 | −98.5244 | 4.5702 | 1.49700 | 81.54 |
| 18 | −10.8481 | 0.0169 | | |
| 19 | −10.8928 | 0.8802 | 1.85478 | 24.80 |
| 20 | −16.2185 | 0.0165 | | |
| 21 | 39.2965 | 6.1385 | 1.49700 | 81.54 |
| 22 | −13.9443 | 0.0160 | | |
| 23 | −13.9005 | 0.9716 | 1.85478 | 24.80 |
| 24 | −49.1119 | 12.9800 | | |
| *25 | −691.1619 | 4.4427 | 1.69350 | 53.18 |
| *26 | −18.8279 | DD [26] | | |
| 27 | 152.3088 | 5.1721 | 1.85478 | 24.80 |
| 28 | −52.1033 | DD [28] | | |
| 29 | 83.1611 | 0.8704 | 1.48749 | 70.24 |
| 30 | 51.7564 | 1.6021 | | |
| 31 | −46.4623 | 0.9161 | 1.85478 | 24.80 |
| 32 | −40.3936 | DD [32] | | |
| 33 | 23.2382 | 2.9106 | 1.59522 | 67.73 |
| 34 | −491.4993 | 0.9486 | | |
| 35 (STOP) | ∞ | 2.9141 | | |
| 36 | 19.2688 | 0.7994 | 1.51742 | 52.43 |
| 37 | 15.2182 | 12.0631 | | |
| 38 | −17.9318 | 0.8558 | 1.85478 | 24.80 |
| 39 | 51.5347 | 0.1436 | | |
| 40 | 64.2360 | 3.3616 | 1.49700 | 81.54 |
| 41 | −23.2884 | 8.7646 | | |
| 42 | 95.0966 | 4.8923 | 1.49700 | 81.54 |
| 43 | −33.3077 | DD [42] | | |
| 44 | 66.3144 | 2.9233 | 1.89286 | 20.36 |
| 45 | −295.6039 | 11.9231 | | |
| 46 | ∞ | 48.4615 | 1.51680 | 64.20 |
| 47 | ∞ | | | |

TABLE 5

EXAMPLE 2 • SPECIFICATION (d LINE)

| | WIDE-ANGLE END | TELEPHOTO END |
|---|---|---|
| ZOOM RATIO | 1.00 | 1.10 |
| f | −4.35 | −4.79 |
| Bf | 43.9 | 43.9 |
| FNo. | 2.50 | 2.55 |
| 2ω [°] | 132.8 | 128.6 |

TABLE 6

EXAMPLE 2 • SURFACE SPACING

| | WIDE-ANGLE END | TELEPHOTO END |
|---|---|---|
| DD [26] | 25.5972 | 27.3540 |
| DD [28] | 59.0377 | 57.2809 |
| DD [32] | 4.8618 | 0.4992 |
| DD [42] | 0.2198 | 4.5824 |

TABLE 7

EXAMPLE 2 • ASPHERIC COEFFICIENT

| | SURFACE NUMBER | | |
|---|---|---|---|
| | 3 | 4 | 5 |
| KA | −1.50000071E+01 | −1.45763118E+00 | −5.47743184E−10 |
| A3 | 1.72541065E−03 | 2.76812132E−03 | −2.63242548E−04 |
| A4 | −4.24969876E−05 | −2.20374222E−04 | 9.30990513E−05 |
| A5 | −5.97245915E−07 | 7.69792189E−05 | 9.43532209E−07 |
| A6 | 4.10131203E−08 | −1.32170292E−05 | −6.02404201E−06 |
| A7 | 1.90831798E−09 | 1.59936118E−06 | −5.25720572E−09 |
| A8 | −8.63903318E−11 | −1.39050584E−07 | −1.90819538E−10 |
| A9 | 1.21707219E−13 | 8.53877310E−09 | −2.20907430E−11 |
| A10 | 6.28878325E−14 | −3.87985050E−10 | 1.85294677E−12 |
| A11 | 1.62628588E−15 | 1.26450977E−11 | |
| A12 | 1.34014845E−16 | −3.01636139E−13 | |
| A13 | −7.99217866E−19 | 5.32878522E−15 | |
| A14 | 1.28358554E−19 | 1.80832567E−17 | |
| A15 | −1.54778274E−20 | 9.47442476E−18 | |
| A16 | −1.09959335E−21 | −9.10531003E−19 | |

| | SURFACE NUMBER | | |
|---|---|---|---|
| | 6 | 25 | 26 |
| KA | −6.53474487E+00 | −1.50000000E+01 | −3.07827839E+00 |
| A3 | −3.85781180E−04 | −3.67099153E−04 | −6.25084975E−04 |
| A4 | 3.40100586E−04 | 1.37926706E−04 | 1.65567430E−04 |
| A5 | −8.16694721E−06 | −1.50292427E−05 | −6.51135648E−06 |
| A6 | 6.31721044E−07 | 1.80733843E−06 | −1.05697263E−06 |
| A7 | 4.95658193E−08 | −4.48674992E−07 | 1.46130183E−07 |
| A8 | −1.96030757E−09 | 6.50122640E−08 | −9.59477425E−09 |
| A9 | −1.38171511E−10 | −4.49919122E−09 | 6.67402263E−10 |
| A10 | 9.12873089E−11 | 8.27736814E−11 | −3.05068004E−11 |
| A11 | | 4.45815737E−12 | 8.79822062E−14 |
| A12 | | 2.87436082E−13 | −1.55539149E−15 |
| A13 | | −6.81163715E−14 | 2.08467541E−15 |
| A14 | | 3.41930206E−15 | −1.93361421E−16 |
| A15 | | −7.03201486E−17 | 4.34160581E−18 |
| A16 | | 1.39841293E−18 | 6.02579429E−19 |

Figure 6:
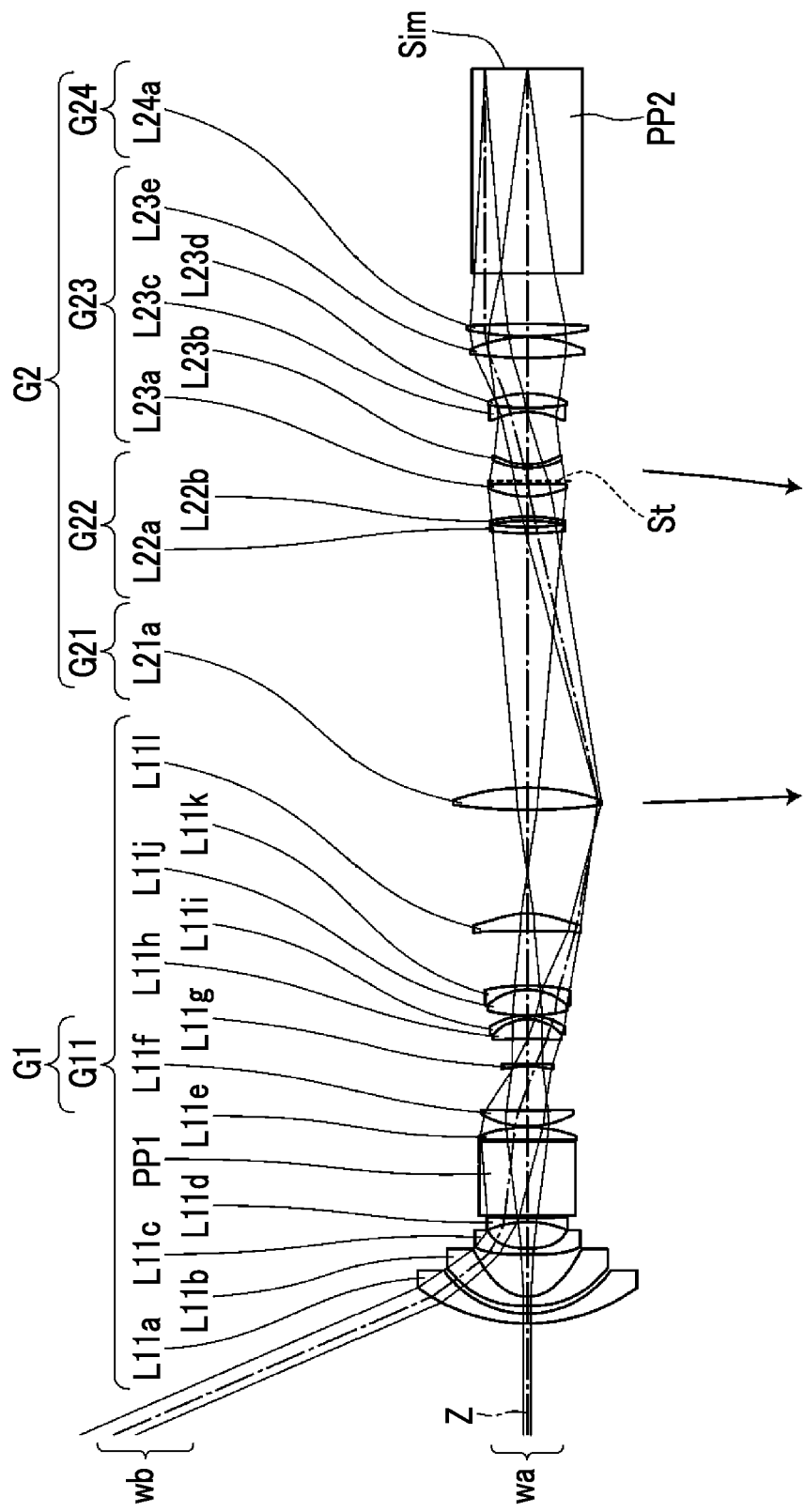
FIG. 6 is a cross-sectional view illustrating a configuration of a wide-angle lens of Example 3 of the present invention in a state where the optical path thereof is developed.
Figure 7:
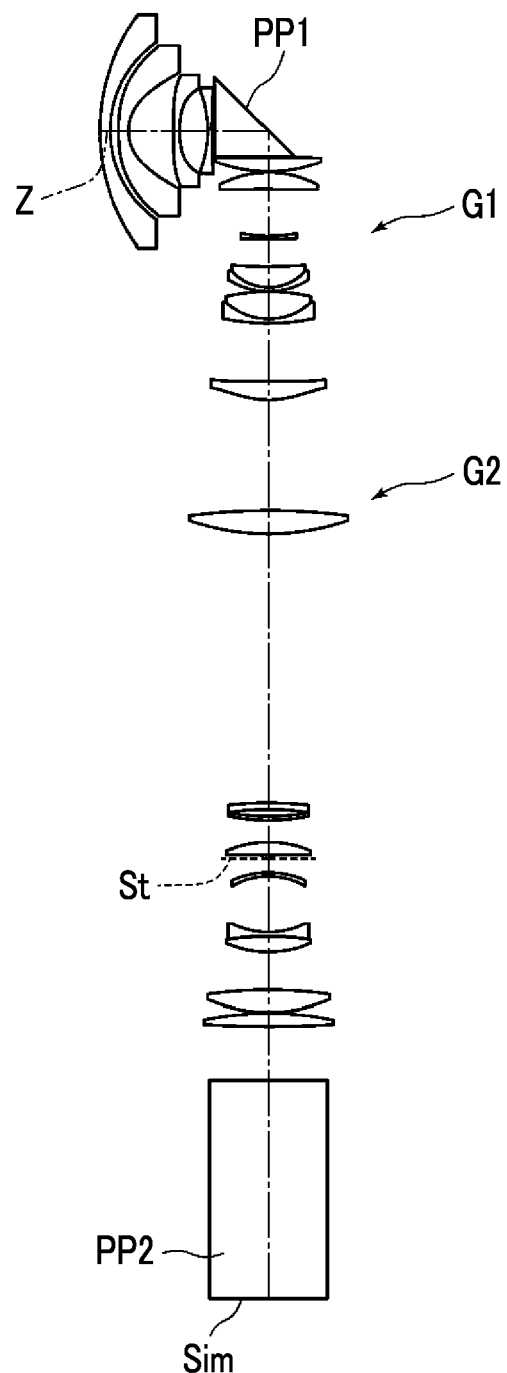
FIG. 7 is a cross-sectional view illustrating a configuration of the wide-angle lens in an actual state.
Figure 14:
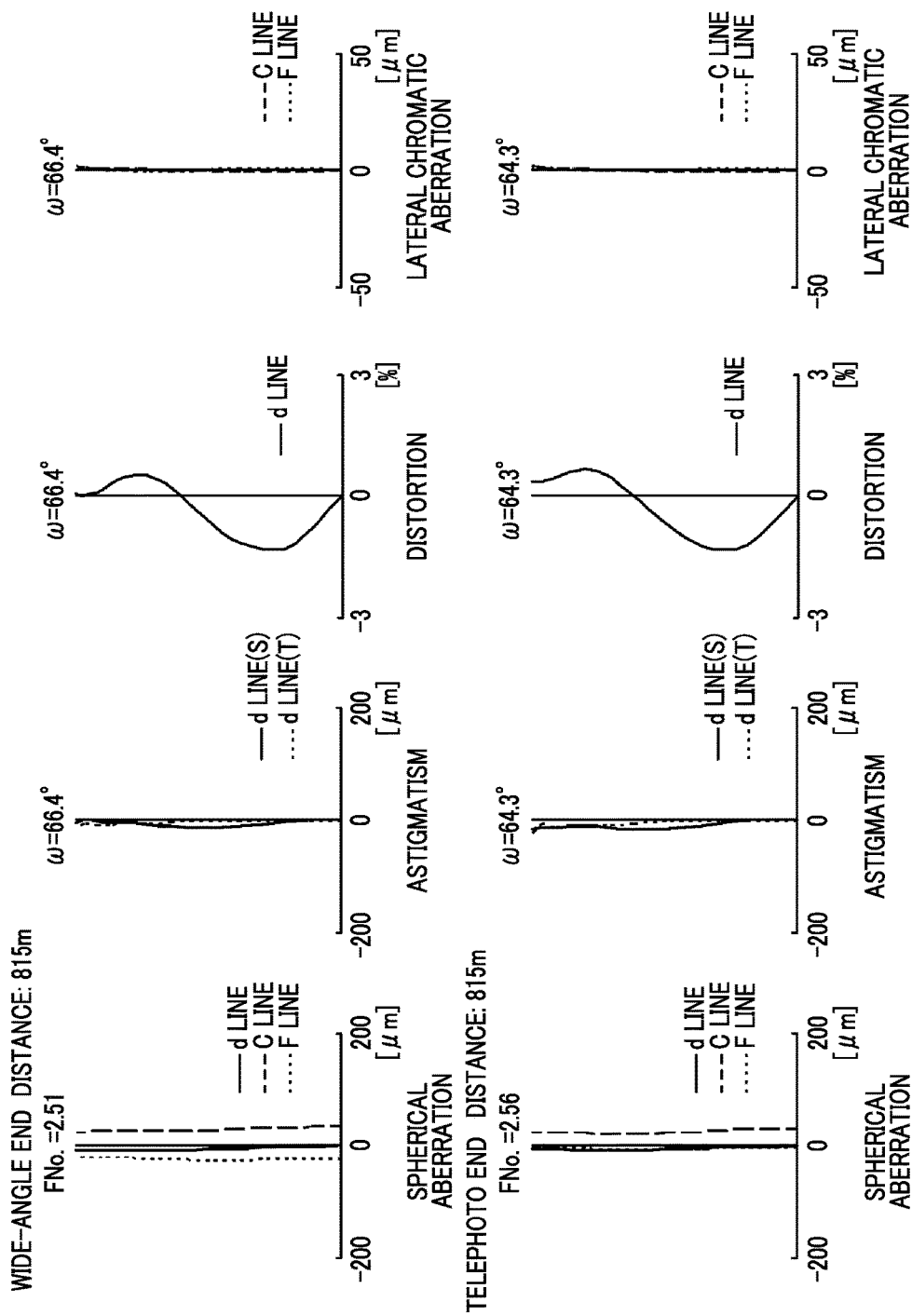
FIG. 14 is a diagram of aberrations of the wide-angle lens of Example 3 of the present invention.

Next, a wide-angle lens of Example 3 will be described. FIG. 6 is a cross-sectional view illustrating a configuration of the wide-angle lens of Example 3 in a state where the optical path thereof is developed. FIG. 7 is a cross-sectional view illustrating a configuration of the wide-angle lens in an actual state. The wide-angle lens of Example 3 is a wide-angle lens having a zooming function, and has the same lens groups and has the same number of lenses as that of Example 2. Table 8 shows lens data of the wide-angle lens of Example 3, Table 9 shows data about specification, Table 10 shows surface spacings which are variable during zooming, Table 11 shows data about aspheric coefficients thereof, and FIG. 14 shows aberration diagrams.

TABLE 8

EXAMPLE 3 • LENS DATA (n AND ν ARE BASED ON d LINE)

| SURFACE NUMBER | RADIUS OF CURVATURE | SURFACE SPACING | n | ν |
|---|---|---|---|---|
| 1 | 43.8581 | 2.3077 | 1.48749 | 70.24 |
| 2 | 24.1068 | 1.8638 | | |
| *3 | 99.7929 | 2.1978 | 1.74320 | 49.29 |
| *4 | 10.8115 | 9.9839 | | |
| *5 | 312.1093 | 1.3738 | 1.80610 | 40.88 |
| *6 | 23.2178 | 6.2608 | | |
| 7 | −24.0318 | 0.9157 | 1.80610 | 33.27 |
| 8 | 147.8776 | 0.5495 | | |
| 9 | ∞ | 17.5824 | 1.56883 | 56.04 |
| 10 | ∞ | 0.2747 | | |
| 11 | 643.0312 | 3.1011 | 1.77250 | 49.60 |
| 12 | −32.7815 | 0.2203 | | |
| 13 | 22.4774 | 3.7403 | 1.85150 | 40.78 |
| 14 | 854.0630 | 10.3939 | | |
| 15 | −29.6332 | 0.6429 | 1.89286 | 20.36 |
| 16 | −154.5876 | 5.9314 | | |
| 17 | −110.0067 | 4.6063 | 1.49700 | 81.54 |
| 18 | −10.7828 | 0.0169 | | |
| 19 | −10.8267 | 0.8801 | 1.85478 | 24.80 |
| 20 | −16.1231 | 0.0165 | | |
| 21 | 40.4879 | 6.0849 | 1.49700 | 81.54 |
| 22 | −13.8698 | 0.0160 | | |
| 23 | −13.8260 | 0.9716 | 1.85478 | 24.80 |
| 24 | −48.4780 | 12.8896 | | |
| *25 | −339.5718 | 4.1532 | 1.69350 | 53.18 |
| *26 | −18.9154 | DD [26] | | |
| 27 | 133.8577 | 5.2489 | 1.85478 | 24.80 |
| 28 | −53.3771 | DD [28] | | |
| 29 | 81.8394 | 1.4114 | 1.48749 | 70.24 |
| 30 | 53.0999 | 1.5397 | | |
| 31 | −49.3236 | 0.9294 | 1.85478 | 24.80 |
| 32 | −41.9046 | DD [32] | | |
| 33 | 23.2935 | 2.8683 | 1.59522 | 67.73 |
| 34 | −805.7511 | 0.7751 | | |
| 35 (STOP) | | 3.0876 | | |
| 36 | 19.1716 | 0.8009 | 1.51742 | 52.43 |
| 37 | 15.0758 | 12.4332 | | |
| 38 | −17.9206 | 0.8641 | 1.85478 | 24.80 |
| 39 | 54.8697 | 0.1362 | | |
| 40 | 68.3061 | 3.3992 | 1.49700 | 81.54 |
| 41 | −23.1309 | 8.4139 | | |
| 42 | 96.6197 | 4.8727 | 1.49700 | 81.54 |
| 43 | −33.1682 | DD [42] | | |
| 44 | 69.3541 | 2.9119 | 1.89286 | 20.36 |
| 45 | −244.5488 | 11.9231 | | |
| 46 | ∞ | 48.4615 | 1.51680 | 64.20 |
| 47 | ∞ | | | |

TABLE 9

EXAMPLE 3 • SPECIFICATION (d LINE)

| | WIDE-ANGLE END | TELEPHOTO END |
|---|---|---|
| ZOOM RATIO | 1.00 | 1.10 |
| f | −4.35 | −4.79 |
| Bf | 43.9 | 43.9 |
| FNo. | 2.51 | 2.56 |
| 2ω [°] | 132.8 | 128.6 |

TABLE 10

EXAMPLE 3 • SURFACE SPACING

| | WIDE-ANGLE END | TELEPHOTO END |
|---|---|---|
| DD [26] | 24.5380 | 26.2860 |
| DD [28] | 60.0031 | 58.2551 |
| DD [32] | 4.8397 | 0.5151 |
| DD [42] | 0.2198 | 4.5444 |

TABLE 11

EXAMPLE 3 • ASPHERIC COEFFICIENT

| | SURFACE NUMBER | | |
|---|---|---|---|
| | 3 | 4 | 5 |
| KA | −1.50000071E+01 | −1.46220183E+00 | −5.47743184E−10 |
| A3 | 1.71484030E−03 | 2.72911736E−03 | −3.13017512E−04 |
| A4 | −4.11395235E−05 | −2.15539855E−04 | 9.43727732E−05 |
| A5 | −6.38500744E−07 | 7.69052208E−05 | 9.46787952E−07 |
| A6 | 4.04645467E−08 | −1.32172888E−05 | −5.95917946E−08 |
| A7 | 1.90962903E−09 | 1.59940465E−06 | −5.25693337E−09 |
| A8 | −8.66290220E−11 | −1.39056391E−07 | −1.87701357E−10 |
| A9 | 9.68688450E−14 | 8.53846905E−09 | −2.21297868E−11 |
| A10 | 6.22805048E−14 | −3.88055363E−10 | 1.88147654E−12 |
| A11 | 1.89486328E−15 | 1.26449909E−11 | |
| A12 | 1.34392491E−16 | −3.02507399E−13 | |
| A13 | −7.07915910E−19 | 5.29743662E−15 | |
| A14 | 1.37329244E−19 | 1.94298977E−17 | |
| A15 | −1.57036109E−20 | 9.66599401E−18 | |
| A16 | −1.16232148E−21 | −8.94015117E−19 | |

| | SURFACE NUMBER | | |
|---|---|---|---|
| | 6 | 25 | 26 |
| KA | −6.75667650E+00 | −1.50000000E+01 | −3.04189306E+00 |
| A3 | −4.25165458E−04 | −3.66323886E−04 | −6.02392573E−04 |
| A4 | 3.43413832E−04 | 1.39035404E−04 | 1.60626724E−04 |
| A5 | −8.77096432E−06 | −1.51276024E−05 | −6.26977468E−06 |
| A6 | 6.42749465E−07 | 1.81908439E−06 | −1.04895752E−06 |
| A7 | 4.99480300E−08 | −4.48199844E−07 | 1.46325653E−07 |
| A8 | −1.89607609E−09 | 6.50194929E−08 | −9.56198249E−09 |
| A9 | −1.50870135E−10 | −4.49914469E−09 | 6.67408850E−10 |
| A10 | 8.84648690E−11 | 8.26978000E−11 | −3.05606763E−11 |
| A11 | | 4.45729554E−12 | 7.81889727E−14 |
| A12 | | 2.87679858E−13 | −2.43183544E−15 |
| A13 | | −6.81023304E−14 | 2.03937282E−15 |
| A14 | | 3.41875911E−15 | −1.89842278E−16 |
| A15 | | −7.05435662E−17 | 4.77011810E−18 |
| A16 | | 1.40699213E−18 | 6.01037747E−19 |

Figure 8:
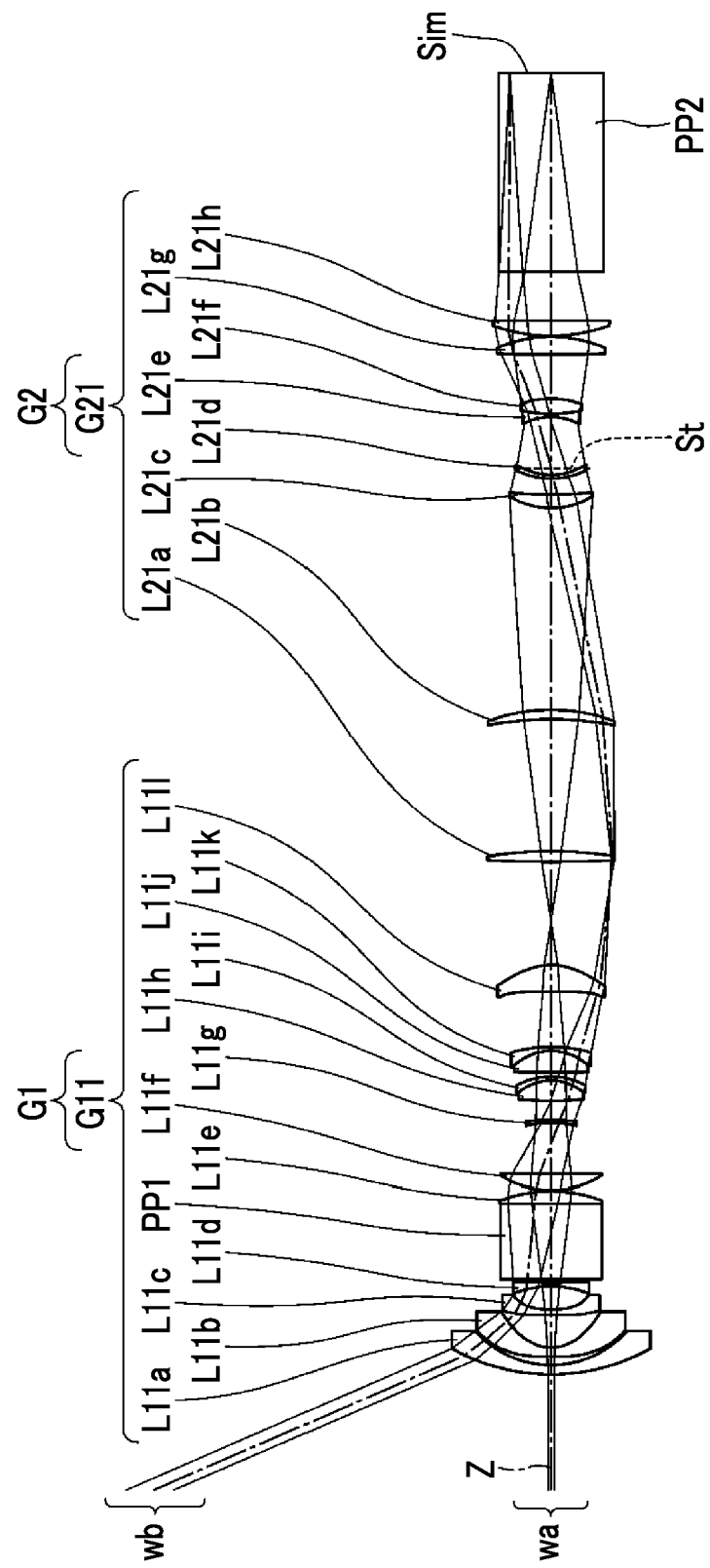
FIG. 8 is a cross-sectional view illustrating a configuration of a wide-angle lens of Example 4 of the present invention in a state where the optical path thereof is developed.
Figure 9:
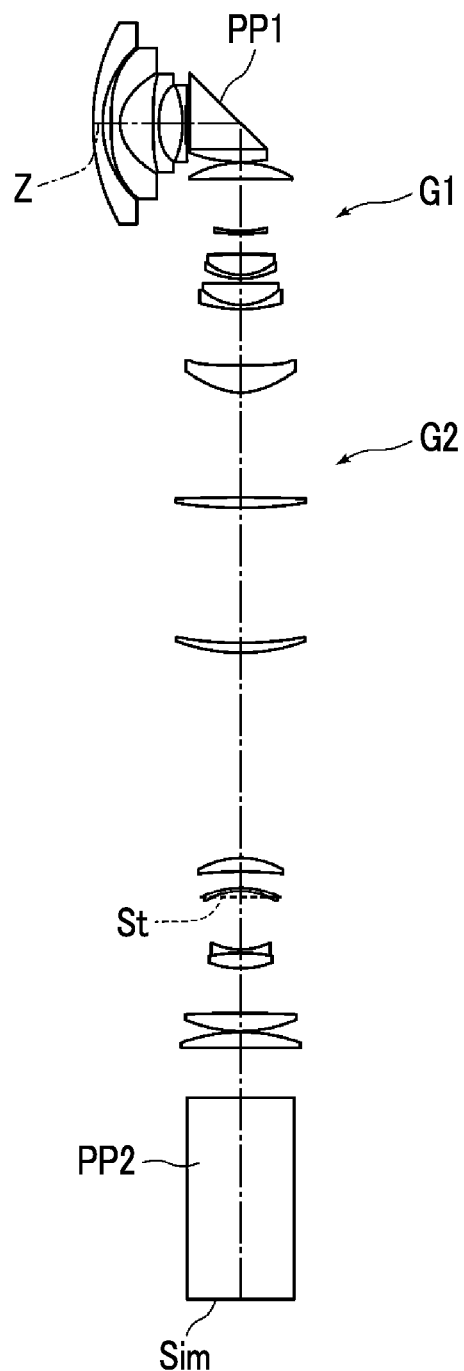
FIG. 9 is a cross-sectional view illustrating a configuration of the wide-angle lens in an actual state.
Figure 15:
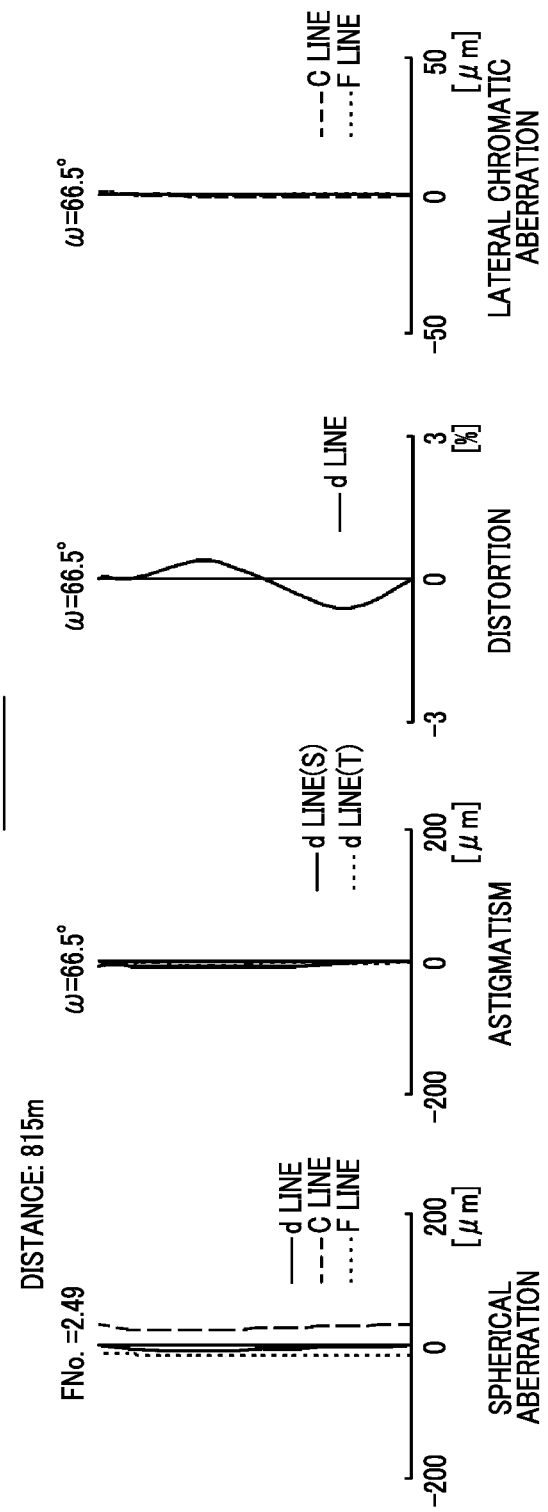
FIG. 15 is a diagram of aberrations of the wide-angle lens of Example 4 of the present invention.

Next, a wide-angle lens of Example 4 will be described. FIG. 8 is a cross-sectional view illustrating a configuration of the wide-angle lens of Example 4 in a state where the optical path thereof is developed. FIG. 9 is a cross-sectional view illustrating a configuration of the wide-angle lens in an actual state. The wide-angle lens of Example 4 has the same lens groups and has the same number of lenses as that of Example 1. Further, Table 12 shows basic lens data of the wide-angle lens of Example 4, Table 13 shows data about specification, and Table 14 shows data about aspheric coefficients. FIG. 15 shows aberration diagrams thereof.

TABLE 12

EXAMPLE 4 • LENS DATA (n AND ν ARE BASED ON d LINE)

| SURFACE NUMBER | RADIUS OF CURVATURE | SURFACE SPACING | n | ν |
|---|---|---|---|---|
| 1 | 49.4405 | 2.3077 | 1.48749 | 70.24 |
| 2 | 24.9064 | 2.0403 | | |
| *3 | −460.6546 | 2.1978 | 1.74320 | 49.29 |
| *4 | 10.7144 | 7.8997 | | |
| *5 | 118.8051 | 1.3731 | 1.80610 | 40.88 |
| *6 | 24.1938 | 5.6889 | | |
| 7 | −24.0185 | 0.9276 | 1.80610 | 33.27 |
| 8 | 240.5426 | 0.8242 | | |
| 9 | ∞ | 18.4121 | 1.56883 | 56.04 |
| 10 | ∞ | 2.9601 | 1.77250 | 49.60 |
| 11 | −35.3170 | 0.2198 | | |
| 12 | 23.3677 | 3.8678 | 1.85150 | 40.78 |
| 13 | 448.2515 | 12.4921 | | |
| 14 | −24.7920 | 0.6696 | 1.89286 | 20.36 |
| 15 | −66.9126 | 4.6967 | | |

TABLE 12-continued

EXAMPLE 4 • LENS DATA (n AND ν ARE BASED ON d LINE)

| SURFACE NUMBER | RADIUS OF CURVATURE | SURFACE SPACING | n | ν |
|---|---|---|---|---|
| 16 | 103.0278 | 4.9451 | 1.49700 | 81.54 |
| 17 | −11.9636 | 0.0168 | | |
| 18 | −12.0799 | 0.8862 | 1.85478 | 24.80 |
| 19 | −18.0599 | 1.0529 | | |
| 20 | 694.8469 | 5.2343 | 1.49700 | 81.54 |
| 21 | −13.1553 | 0.0295 | | |
| 22 | −13.0873 | 0.9921 | 1.85478 | 24.80 |
| 23 | −33.6987 | 13.5167 | | |
| *24 | −149.5271 | 6.5023 | 1.58573 | 59.70 |
| *25 | −13.1024 | 25.1778 | | |
| 26 | 380.5964 | 2.5500 | 1.85478 | 24.80 |
| 27 | −97.4037 | 32.4093 | | |
| 28 | −82.7617 | 2.3310 | 1.85478 | 24.80 |
| 29 | −43.9170 | 49.2464 | | |
| 30 | 19.3717 | 3.2864 | 1.59522 | 67.73 |
| 31 | 96.0753 | 3.9207 | | |
| 32 | 19.4676 | 0.8656 | 1.51742 | 52.43 |
| 33 | 15.2420 | 1.5000 | | |
| 34 (STOP) | ∞ | 12.6110 | | |
| 35 | −15.2739 | 0.8130 | 1.85478 | 24.80 |
| 36 | 37.9138 | 0.0415 | | |
| 37 | 39.6455 | 3.6659 | 1.49700 | 81.54 |
| 38 | −20.9497 | 10.5048 | | |
| 39 | 267.8752 | 4.3608 | 1.49700 | 81.54 |
| 40 | −33.0352 | 0.2198 | | |
| 41 | 40.8511 | 3.7659 | 1.80809 | 22.76 |
| 42 | 1808.8859 | 11.9231 | | |
| 43 | ∞ | 48.4615 | 1.51680 | 64.20 |
| 44 | ∞ | | | |

TABLE 13

EXAMPLE 4 • SPECIFICATION (d LINE)

| ZOOM RATIO | 1.00 |
|---|---|
| f | −4.35 |
| Bf | 43.9 |
| FNo. | 2.49 |
| 2ω [°] | 133.0 |

TABLE 14

EXAMPLE 4 • ASPHERIC COEFFICIENT

| | SURFACE NUMBER | | |
|---|---|---|---|
| | 3 | 4 | 5 |
| KA | −1.50000072E+01 | −1.65011795E+00 | −5.58545512E−08 |
| A3 | 1.53490460E−03 | 2.31971233E−03 | −5.74622029E−04 |
| A4 | −3.27413410E−05 | −2.68596471E−04 | 8.68610825E−05 |
| A5 | −4.52137836E−07 | 7.77605603E−05 | 9.62365427E−07 |
| A6 | 4.15510399E−08 | −1.31926238E−05 | −6.24964615E−08 |
| A7 | 2.14481649E−09 | 1.60399378E−06 | −5.07601474E−09 |
| A8 | −8.62221384E−11 | −1.38447465E−07 | −2.05700164E−10 |
| A9 | −1.50244893E−13 | 8.56664370E−09 | −1.90127341E−11 |
| A10 | 5.12319079E−14 | −3.86943906E−10 | 1.48273674E−12 |
| A11 | −8.80460141E−16 | 1.26381352E−11 | |
| A12 | 1.29158204E−16 | −3.11740983E−13 | |
| A13 | 6.19961308E−19 | 4.57844090E−15 | |
| A14 | 2.39319264E−19 | −6.91651321E−18 | |
| A15 | −8.15058883E−21 | 8.31062051E−18 | |
| A16 | −4.88626171E−22 | −8.30855468E−19 | |
| A17 | 0.00000000E+00 | | |
| A18 | 0.00000000E+00 | | |

TABLE 14-continued

EXAMPLE 4 • ASPHERIC COEFFICIENT

| | SURFACE NUMBER | | |
|---|---|---|---|
| | 6 | 24 | 25 |
| KA | −3.73609371E+00 | −1.50000000E+01 | −1.39925521E+00 |
| A3 | −6.40630783E−04 | −1.75064617E−04 | −3.33470439E−04 |
| A4 | 3.14300333E−04 | 1.16469053E−04 | 1.32679171E−04 |
| A5 | −4.94657849E−06 | −1.68271522E−05 | −6.71847224E−06 |
| A6 | 2.76991268E−07 | 1.82663811E−06 | −1.11699633E−06 |
| A7 | 3.72822209E−08 | −4.46287848E−07 | 1.43616127E−07 |
| A8 | −5.69901312E−10 | 6.51111135E−08 | −9.62315644E−09 |
| A9 | −9.54588376E−11 | −4.50023221E−09 | 6.80528847E−10 |
| A10 | 5.92184805E−11 | 8.25159646E−11 | −2.96286636E−11 |
| A11 | | 4.39773990E−12 | 1.51007067E−13 |
| A12 | | 2.85570493E−13 | −1.54202197E−15 |
| A13 | | −6.82389473E−14 | 1.68587267E−15 |
| A14 | | 3.41932564E−15 | −2.17285980E−16 |
| A15 | | −6.96549562E−17 | 3.85910989E−18 |
| A16 | | 1.48055498E−18 | 6.13961954E−19 |

Figure 10:
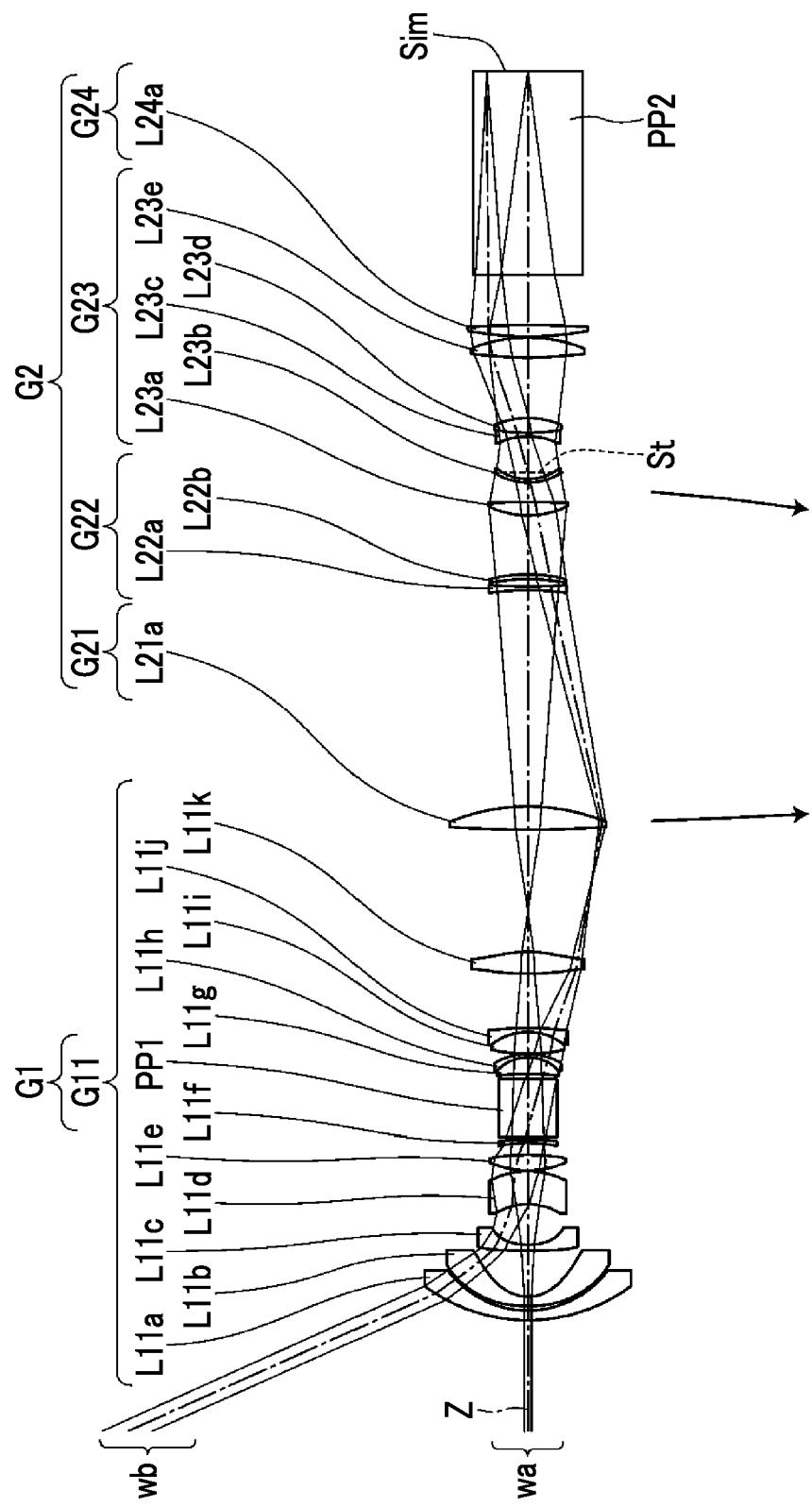
FIG. 10 is a cross-sectional view illustrating a configuration of a wide-angle lens of Example 5 of the present invention in a state where the optical path thereof is developed.
Figure 11:
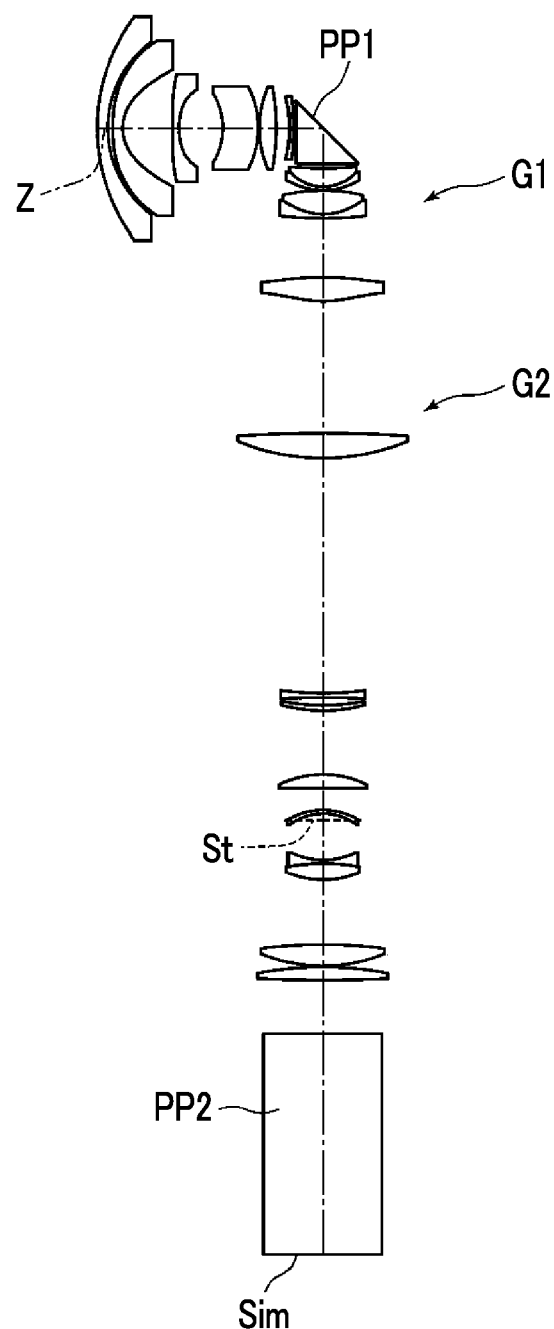
FIG. 11 is a cross-sectional view illustrating a configuration of the wide-angle lens in an actual state.
Figure 16:
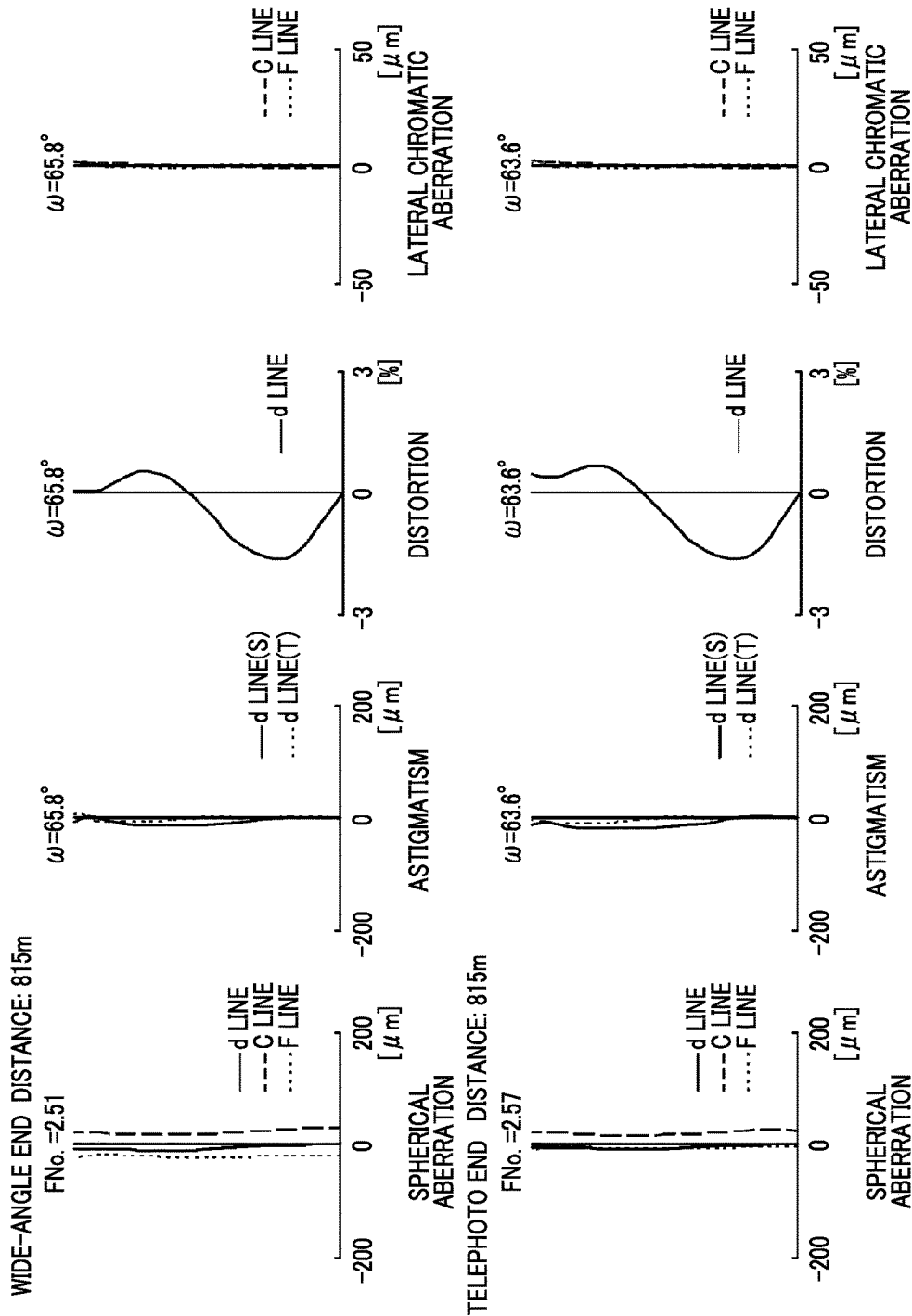
FIG. 16 is a diagram of aberrations of the wide-angle lens of Example 5 of the present invention.

Next, a wide-angle lens of Example 5 will be described. FIG. 10 is a cross-sectional view illustrating a configuration of the wide-angle lens of Example 5 in a state where the optical path thereof is developed. FIG. 11 is a cross-sectional view illustrating a configuration of the wide-angle lens in an actual state. The wide-angle lens of Example 5 is a wide-angle lens having a zooming function, and has the same lens groups and has the same number of lenses as that of Example 2 except that the first-1 lens group G11 includes the optical axis deflection prism PP1 and eleven lenses as lenses L11a to L11k. Table 15 shows lens data of the wide-angle lens of Example 5, Table 16 shows data about specification, Table 17 shows surface spacings which are variable during zooming, Table 18 shows data about aspheric coefficients thereof, and FIG. 16 shows aberration diagrams.

TABLE 15

EXAMPLE 5 • LENS DATA (n AND ν ARE BASED ON d LINE)

| SURFACE NUMBER | RADIUS OF CURVATURE | SURFACE SPACING | n | ν |
|---|---|---|---|---|
| 1 | 42.1358 | 2.3796 | 1.48749 | 70.24 |
| 2 | 24.3020 | 1.1422 | | |
| *3 | 81.4345 | 2.2663 | 1.74320 | 49.29 |
| *4 | 11.1558 | 11.3053 | | |
| *5 | 628826.1570 | 1.4161 | 1.80610 | 40.88 |
| *6 | 17.1403 | 9.9381 | | |
| 7 | −14.9170 | 8.0371 | 1.77250 | 49.60 |
| 8 | −20.1571 | 0.2271 | | |
| 9 | 23.5203 | 3.8306 | 1.85150 | 40.78 |
| 10 | −51.6815 | 2.9608 | | |
| 11 | −29.4511 | 0.7499 | 1.89286 | 20.36 |
| 12 | −56.0467 | 0.5666 | | |
| 13 | ∞ | 14.1643 | 1.51680 | 64.20 |
| 14 | ∞ | 1.1331 | | |
| 15 | −75.6956 | 4.1295 | 1.49700 | 81.54 |
| 16 | −10.1338 | 0.0165 | | |
| 17 | −10.1397 | 0.7968 | 1.85478 | 24.80 |
| 18 | −15.8866 | 0.0168 | | |
| 19 | 37.6601 | 5.3562 | 1.49700 | 81.54 |
| 20 | −14.1731 | 0.0165 | | |
| 21 | −14.1714 | 0.9194 | 1.85478 | 24.80 |
| 22 | −84.4633 | 13.3573 | | |
| *23 | 76.4382 | 5.4109 | 1.69350 | 53.18 |
| *24 | −24.5331 | DD [24] | | |
| 25 | 298.0018 | 5.6498 | 1.85478 | 24.80 |
| 26 | −50.1708 | DD [26] | | |
| 27 | −73.9662 | 0.9585 | 1.48749 | 70.24 |
| 28 | 165.4783 | 1.7614 | | |
| 29 | −48.4954 | 1.2056 | 1.85478 | 24.80 |
| 30 | −35.4541 | DD [30] | | |

TABLE 15-continued

EXAMPLE 5 • LENS DATA (n AND ν ARE BASED ON d LINE)

| SURFACE NUMBER | RADIUS OF CURVATURE | SURFACE SPACING | n | ν |
|---|---|---|---|---|
| 31 | 22.1734 | 3.1730 | 1.59522 | 67.73 |
| 32 | −1427.6963 | 4.8881 | | |
| 33 | 15.3218 | 0.8268 | 1.51742 | 52.43 |
| 34 | 12.8555 | 1.5205 | | |
| 35 (STOP) | ∞ | 8.9345 | | |
| 36 | −17.1925 | 0.8270 | 1.85478 | 24.80 |
| 37 | 43.5166 | 0.0645 | | |
| 38 | 47.2051 | 3.6105 | 1.49700 | 81.54 |
| 39 | −20.8613 | 14.6350 | | |
| 40 | 105.3990 | 4.8861 | 1.49700 | 81.54 |
| 41 | −36.3036 | DD [41] | | |
| 42 | 76.1479 | 2.7521 | 1.89286 | 20.36 |
| 43 | −333.7515 | 12.2946 | | |
| 44 | ∞ | 49.9717 | 1.51680 | 64.20 |
| 45 | ∞ | | | |

TABLE 16

EXAMPLE 5 • SPECIFICATION (d LINE)

| | WIDE-ANGLE END | TELEPHOTO END |
|---|---|---|
| ZOOM RATIO | 1.00 | 1.10 |
| f | −4.49 | −4.93 |
| Bf | 45.2 | 45.2 |
| FNo. | 2.51 | 2.57 |
| 2ω [°] | 131.6 | 127.2 |

TABLE 17

EXAMPLE 5·SURFACE SPACING

| | WIDE-ANGLE END | TELEPHOTO END |
|---|---|---|
| DD [24] | 29.9045 | 31.4805 |
| DD [26] | 53.2244 | 51.6484 |
| DD [30] | 14.4476 | 9.5427 |
| DD [41] | 0.2266 | 5.1315 |

TABLE 18

EXAMPLE 5 • ASPHERIC COEFFICIENT

| | SURFACE NUMBER | | |
|---|---|---|---|
| | 3 | 4 | 5 |
| KA | −1.50000075E+01 | −1.63082963E+00 | 0.00000000E+00 |
| A3 | 1.66236138E−03 | 2.67579547E−03 | −6.54418908E−05 |
| A4 | −5.28416220E−05 | −1.85743580E−04 | 5.58037762E−05 |
| A5 | −4.30863311E−07 | 6.46026281E−05 | 6.85337346E−07 |
| A6 | 4.69618181E−08 | −1.13822584E−05 | −4.24507388E−08 |
| A7 | 1.92036927E−09 | 1.33068655E−06 | −4.02002440E−09 |
| A8 | −5.26753546E−11 | −1.12247411E−07 | −1.76521100E−10 |
| A9 | 3.17670847E−13 | 6.70591130E−09 | −2.62350054E−11 |
| A10 | 5.15904303E−14 | −2.92681000E−10 | 1.50887946E−12 |
| A11 | 1.79611193E−16 | 9.45832025E−12 | |
| A12 | 3.60371881E−17 | −2.01310452E−13 | |
| A13 | −3.36135029E−18 | 4.51499411E−15 | |
| A14 | −7.54352871E−21 | 5.21090099E−17 | |
| A15 | −3.38253954E−21 | 5.91541009E−18 | |
| A16 | 3.77168855E−22 | −1.57148282E−18 | |

| | SURFACE NUMBER | | |
|---|---|---|---|
| | 6 | 23 | 24 |
| KA | −3.84389705E+00 | −1.49999965E+01 | −1.10692581E+01 |
| A3 | −8.27223752E−05 | −2.57686284E−04 | −6.16106336E−04 |
| A4 | 3.10217421E−04 | 1.30578362E−04 | 1.47429954E−04 |
| A5 | −1.52428349E−06 | −1.38604174E−05 | −5.34249106E−06 |
| A6 | 3.45529130E−07 | 1.57580085E−06 | −9.17172414E−07 |
| A7 | 2.50299009E−08 | −3.71377218E−07 | 1.20024524E−07 |
| A8 | 3.81328454E−10 | 5.22947180E−08 | −7.75223598E−09 |
| A9 | 1.27144712E−10 | −3.51357228E−09 | 5.24936926E−10 |
| A10 | 8.84172853E−11 | 6.29842275E−11 | −2.22659831E−11 |
| A11 | | 3.33822328E−12 | 8.67500323E−14 |
| A12 | | 2.07364566E−13 | −7.99004134E−16 |
| A13 | | −4.71246708E−14 | 1.56028351E−15 |
| A14 | | 2.31210204E−15 | −1.39084734E−16 |
| A15 | | −4.57547376E−17 | 2.86469609E−18 |
| A16 | | 5.42159697E−19 | 2.12497211E−19 |

Table 19 shows values corresponding to Conditional Expressions (1) to (6) of the wide-angle lenses of Examples 1 to 5. It should be noted that, in the above-mentioned examples, the d line is set as the reference wavelength, and the values shown in the following Table 19 are values at the reference wavelength.

TABLE 19

| EXPRESSION NUMBER | CONDITIONAL EXPRESSION | EXAMPLE 1 | EXAMPLE 2 | EXAMPLE 3 | EXAMPLE 4 | EXAMPLE 5 |
|---|---|---|---|---|---|---|
| (1) | xf/L1 | 0.209 | 0.238 | 0.238 | 0.210 | 0.447 |
| (2) | xr/L1 | 0.368 | 0.402 | 0.403 | 0.403 | 0.589 |
| (3) | d/\|f\| | 4.042 | 4.042 | 4.042 | 4.233 | 3.155 |
| (4) | b/a | 7.57 | 6.94 | 6.90 | 7.53 | 6.43 |
| (5) | f1/\|f\| | 1.315 | 1.331 | 1.348 | 1.316 | 1.410 |
| (6) | νd | 56.04 | 56.04 | 56.04 | 55.15 | 64.20 |

As can be seen from the above-mentioned data, all the wide-angle lenses of Examples 1 to 5 satisfy Conditional Expressions (1) to (6), and are wide-angle lenses each of which has a total angle of view (a total angle of view at the wide-angle end in the case where the wide-angle lens has a zooming function) of 130° or more and in which various aberrations are satisfactorily corrected with a wide angle.

Figure 17:
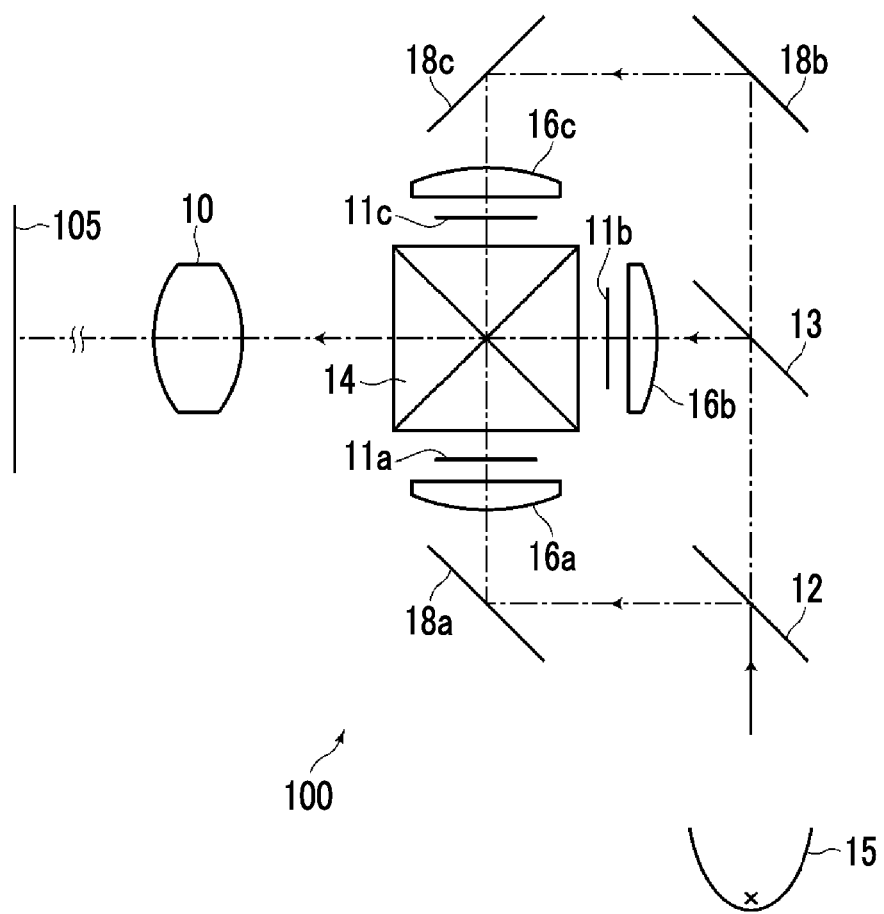
FIG. 17 is a schematic configuration diagram of a projection display device according to an embodiment of the present invention.

Next, a projection display device according to an embodiment of the present invention will be described. FIG. 17 is a schematic configuration diagram of the projection display device according to the embodiment of the present invention. The projection display device 100 shown in FIG. 17 has a wide-angle lens 10 according to the embodiment of the present invention, a light source 15, transmissive display elements 11a to 11c as light valves corresponding to respective color light beams, dichroic mirrors 12 and 13 for color separation, a cross dichroic prism 14 for color synthesis, condenser lenses 16a to 16c, and total reflection mirrors 18a to 18c for deflecting the optical path. In FIG. 17, the wide-angle lens 10 is schematically illustrated. Further, an integrator is disposed between the light source 15 and the dichroic mirror 12, but illustration thereof is omitted in FIG. 17.

White light originating from the light source 15 is separated into rays with three colors (G light, B light, R light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the wide-angle lens 10. The wide-angle lens 10 projects an optical image, which is formed by the light modulated through the transmissive display elements 11a to 11c, onto a screen 105.

Figure 18:
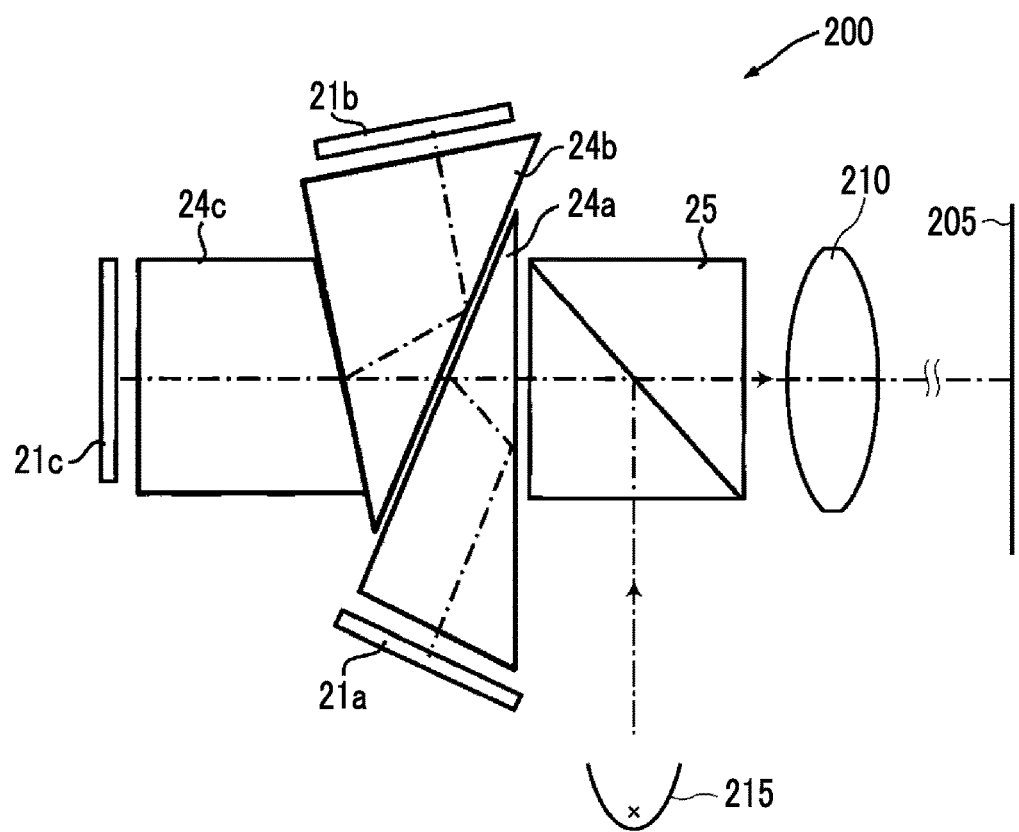
FIG. 18 is a schematic configuration diagram of a projection display device according to another embodiment of the present invention.

FIG. 18 is a schematic configuration diagram of a projection display device according to another embodiment of the present invention. The projection display device 200 shown in FIG. 18 has a wide-angle lens 210 according to the embodiment of the present invention, a light source 215, DMD elements 21a to 21c as light valves corresponding to respective color light beams, total internal reflection (TIR) prisms 24a to 24c for color separation and color synthesis, and a polarization separating prism 25 that separates illumination light and projection light. In FIG. 18, the wide-angle lens 210 is schematically illustrated. Further, an integrator is disposed between the light source 215 and the polarization separating prism 25, but illustration thereof is omitted in FIG. 18.

White light originating from the light source 215 is reflected on a reflective surface inside the polarization separating prism 25, and is separated into rays with three colors (G light, B light, R light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the wide-angle lens 210. The wide-angle lens 210 projects an optical image, which is formed by the light modulated through the DMD elements 21a to 21c, onto a screen 205.

Figure 19:
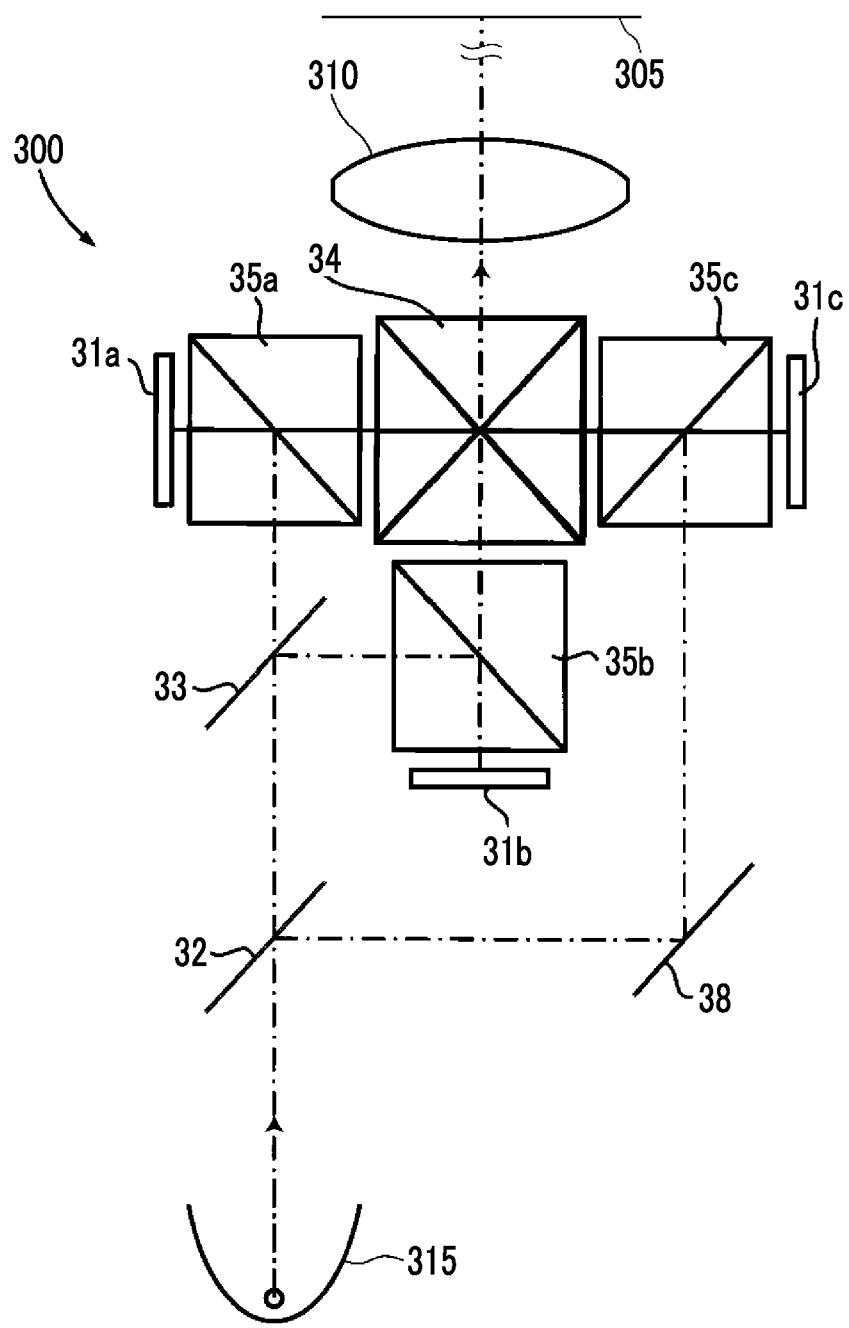
FIG. 19 is a schematic configuration diagram of a projection display device according to still another embodiment of the present invention.

FIG. 19 is a schematic configuration diagram of a projection display device according to still another embodiment of the present invention. The projection display device 300 shown in FIG. 19 has a wide-angle lens 310 according to the embodiment of the present invention, a light source 315, reflective display elements 31a to 31c as light valves corresponding to respective color light beams, dichroic mirrors 32 and 33 for color separation, a cross dichroic prism 34 for color synthesis, a total reflection mirror 38 for deflecting the optical path, and polarization separating prisms 35a to 35c. In FIG. 19, the wide-angle lens 310 is schematically illustrated. Further, an integrator is disposed between the light source 315 and the dichroic mirror 32, but illustration thereof is omitted in FIG. 19.

White light originating from the light source 315 is separated into rays with three colors (G light, B light, R light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the wide-angle lens 310. The wide-angle lens 310 projects an optical image, which is formed by the light modulated through the reflective display elements 31a to 31c, onto a screen 305.

Figure 20:
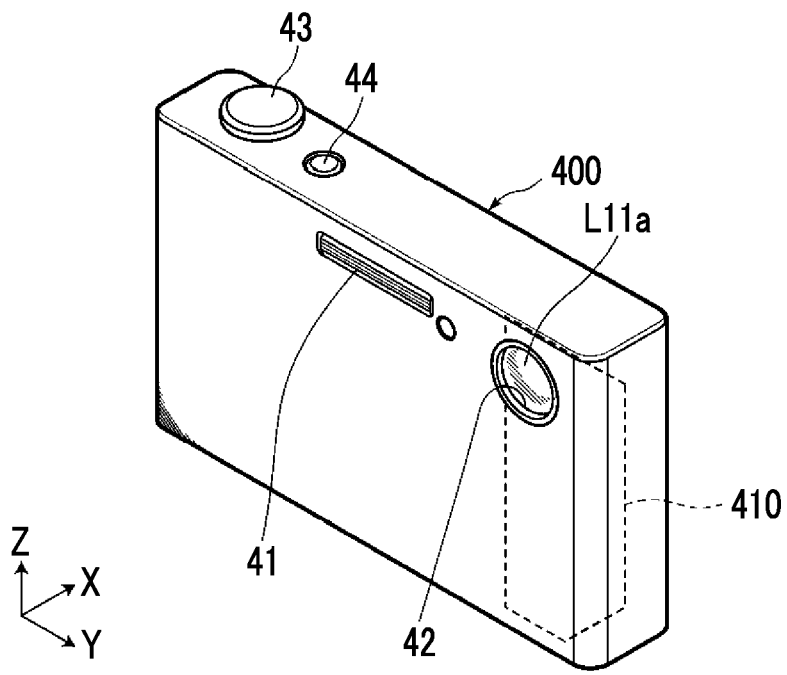
FIG. 20 is a perspective view of the front side of an imaging apparatus according to an embodiment of the present invention.
Figure 21:
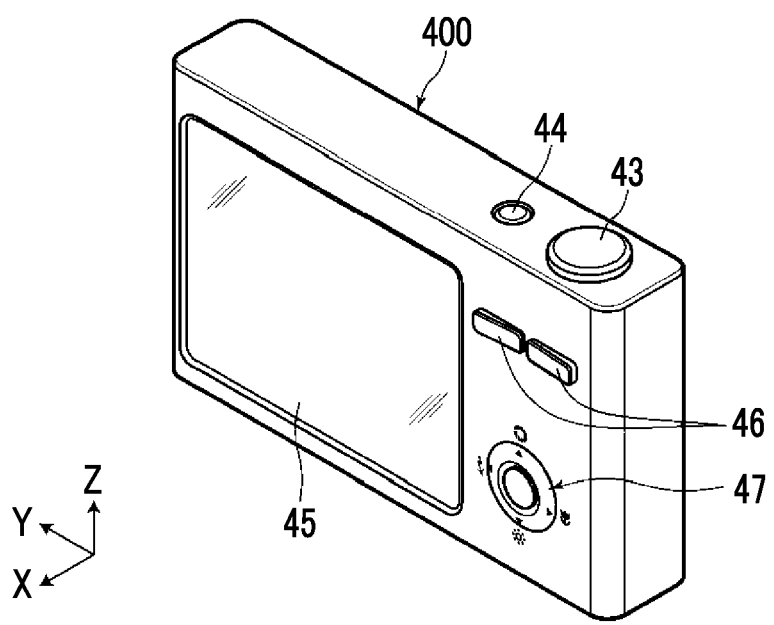
FIG. 21 is a perspective view of the rear side of the imaging apparatus shown in FIG. 20.

FIGS. 20 and 21 are external views of a camera 400 which is the imaging apparatus according to the embodiment of the present invention. FIG. 20 is a perspective view of the camera 400 viewed from the front side, and FIG. 21 is a perspective view of the camera 400 viewed from the rear side. The digital still camera 400 comprises a strobe light emitting section 41 which emits strobe light onto on the upper part at the center on the front side. Further, an imaging aperture 42, through which light emitted from the imaging target is incident, is provided on the side part of the strobe light emitting section 41 on the front side. The digital still camera 400 further comprises a release button 43 and a power button 44 on the upper side. The digital still camera 400 further comprises a display section 45 and operation sections 46 and 47 on the rear side. The display section 45 is for displaying a captured image. In the digital still camera 400, by pressing the release button 43, image data, which is obtained through the imaging performed by capturing a still image or a moving image per one frame, is recorded into a memory card (not shown in the drawing) mounted on the digital still camera 400.

The digital still camera 400 comprises a wide-angle lens 410 inside a casing. The wide-angle lens 410 is disposed such that the lens L11a closest to the object side is positioned at the imaging aperture 42 which is provided on the front side. The wide-angle lens 410 is integrally built to be vertically long inside the digital still camera 400 in a state where the optical axis thereof after deflected by the optical axis deflection prism (at a position closer to the reduction side than the optical axis deflection prism) coincides with the vertical direction of the camera body. In addition, the wide-angle lens 410 is integrally built to be horizontally long inside the digital still camera 400 in a state where the optical axis thereof after deflected coincides with the horizontal direction of the camera body.

The present invention has been hitherto described through embodiments and examples, but the wide-angle lens of the present invention is not limited to the above-mentioned embodiments and examples, and may be modified into various forms. For example, the radius of curvature, the surface spacing, the refractive index, and the Abbe number of each lens may be appropriately changed.

Further, the projection display device of the present invention is not limited to that of the above-mentioned configuration. For example, the used light valve and the optical member used in separation or synthesis of rays are not limited to those of the above-mentioned configuration, and may be modified into various forms.

Further, the imaging apparatus of the present invention is also not limited to the above-mentioned configurations. For example, the present invention may be applied to a single-lens reflex camera, a film camera, a video camera, and the like.

EXPLANATION OF REFERENCES 10, 210, 310, 410: wide-angle lens
11a to 11c: transmissive display element
12, 13, 32, 33: dichroic mirror
14, 34: cross dichroic prism
15, 215, 315: light source
16a to 16c: condenser lens
18a to 18c, 38: total reflection mirror
21a to 21c: DMD element
24a to 24c: TIR prism
25, 35a to 35c: polarization separating prism
31a to 31c: reflective display element
41: strobe light emitting section
42: imaging aperture
43: release button
44: power button
45: display section
46, 47: operation section
100, 200, 300: projection display device
105, 205, 305: screen
400: digital still camera
G1: first optical system
G11: first-1 lens group
G2: second optical system
G21: second-1 lens group
G22: second-2 lens group
G23: second-3 lens group
G24: second-4 lens group
L11a to L24a: lens
PP1: optical axis deflection prism
PP2: optical member
R: reflection member
Sim: image display surface
St: aperture stop
wa: on-axis rays
wb: rays with maximum angle of view
Z: optical axis

What is claimed is:

1. A wide-angle lens that forms an intermediate image at a position conjugate to a reduction side imaging plane and forms the intermediate image again on a magnification side imaging plane, the wide-angle lens comprising:
a first optical system on the magnification side; and
a second optical system on the reduction side,
wherein the intermediate image is formed between the magnification side and the reduction side, and
wherein the first optical system has an optical axis deflection prism which satisfies Conditional Expressions (1) to (3), $$0.1 < xf/L1 < 0.6 \quad (1),$$

$$0.2 < xr/L1 < 0.8 \quad (2), \text{ and}$$

$$2.5 < d/|f| \quad (3),$$

where xf is a distance on an optical axis from a magnification side surface of a lens closest to the magnification side in the first optical system to a magnification side surface of the optical axis deflection prism,
xr is a distance on the optical axis from the magnification side surface of the lens closest to the magnification side in the first optical system to a reduction side surface of the optical axis deflection prism,
L1 is a distance on the optical axis from the magnification side surface of the lens closest to the magnification side in the first optical system to the intermediate image,
d is a length of the optical axis within the optical axis deflection prism, and
f is a focal length of the whole system.

2. The wide-angle lens according to claim 1,
wherein Conditional Expression (4) is satisfied, $$3 < b/a < 12 \quad (4),$$

where b is a ray diameter within a meridian plane of a maximum image height at an F number which is five times a design F number at a wide-angle end, and
a is a ray diameter of on-axis rays at the F number which is five times the design F number at the wide-angle end.

3. The wide-angle lens according to claim 1,
wherein the optical axis deflection prism is a prism which deflects the optical axis by 90°.

4. The wide-angle lens according to claim 3,
wherein the optical axis deflection prism is a right angle prism.

5. The wide-angle lens according to claim 3,
wherein the optical axis deflection prism is formed by bonding a lens to a right angle prism.

6. The wide-angle lens according to claim 1, further comprising
a reflection member that further deflects the optical axis by 90°, at a position closer to the reduction side than the optical axis deflection prism.

7. The wide-angle lens according to claim 1,
wherein Conditional Expression (5) is satisfied, $$0.8 < f1/|f| < 2 \quad (5),$$

where f1 is a focal length of the first optical system.

8. The wide-angle lens according to claim 1,
wherein Conditional Expression (6) is satisfied, $$30 < vd \quad (6),$$

where vd is an Abbe number of the optical axis deflection prism based on a d line.

9. The wide-angle lens according to claim 1,
wherein Conditional Expression (1-1) is satisfied, $$0.15 < xf/L1 < 0.5 \quad (1\text{-}1).$$

10. The wide-angle lens according to claim 1,
wherein Conditional Expression (2-1) is satisfied, $$0.3 < xr/L1 < 0.7 \quad (2\text{-}1).$$

11. The wide-angle lens according to claim 1,
wherein Conditional Expression (3-1) is satisfied, $$3 < d/|f| < 8 \quad (3\text{-}1)$$

12. The wide-angle lens according to claim 2,
wherein Conditional Expression (4-1) is satisfied, $$5 < b/a < 8 \quad (4\text{-}1).$$

13. The wide-angle lens according to claim 7,
wherein Conditional Expression (5-1) is satisfied, $$1 < f1/|f| < 1.7 \quad (5\text{-}1).$$

14. The wide-angle lens according to claim 8,
wherein Conditional Expression (6-1) is satisfied.

$$45 < vd < 65 \quad (6\text{-}1)$$

15. A projection display device comprising:
a light source;
a light valve into which light originating from the light source is incident; and the wide-angle lens according to claim 1, the wide-angle lens projecting an optical image, which is formed by light modulated through the light valve, onto a screen.

16. An imaging apparatus comprising the wide-angle lens according to claim 1.

\* \* \* \* \*